United States Patent
Zuchowicz et al.

(10) Patent No.: US 12,458,016 B2
(45) Date of Patent: Nov. 4, 2025

(54) HIGH THROUGHPUT SYSTEM FOR PRODUCTION AND VITRIFICATION OF BIOMATERIALS IN CRYOPROTECTANT DROPLETS

(71) Applicants: Regents of the University of Minnesota, Minneapolis, MN (US); Smithsonian Institution, Washington, DC (US)

(72) Inventors: Nikolas Zuchowicz, Kaneohe, HI (US); Mary Hagedorn, Kaneohe, HI (US); Jonathan Daly, Kaneohe, HI (US); Li Zhan, St. Paul, MN (US); Kanav Khosla, Minneapolis, MN (US); John Bischof, St. Paul, MN (US)

(73) Assignees: Regents of the University of Minnesota, Minneapolis, MN (US); Smithsonian Institution, Washington, DC (US)

( * ) Notice: Subject to any disclaimer, the term of this patent is extended or adjusted under 35 U.S.C. 154(b) by 1099 days.

(21) Appl. No.: 17/431,361

(22) PCT Filed: Feb. 25, 2020

(86) PCT No.: PCT/US2020/019692
§ 371 (c)(1),
(2) Date: Aug. 16, 2021

(87) PCT Pub. No.: WO2020/176498
PCT Pub. Date: Sep. 3, 2020

(65) Prior Publication Data
US 2022/0132837 A1 May 5, 2022

Related U.S. Application Data

(60) Provisional application No. 62/811,847, filed on Feb. 28, 2019.

(51) Int. Cl.
*A01N 1/02* (2006.01)
*A01N 1/145* (2025.01)
*F25D 3/11* (2006.01)

(52) U.S. Cl.
CPC ............... *A01N 1/145* (2025.01); *F25D 3/11* (2013.01)

(58) Field of Classification Search
CPC ..... F25D 3/11; F25D 2400/30; A01N 1/0257; A01N 1/02; A01N 1/0221; F25C 1/00; G01N 1/42
See application file for complete search history.

(56) References Cited

U.S. PATENT DOCUMENTS 5,328,821 A    7/1994  Fisher et al.
5,660,076 A *  8/1997  Jonkka ............. F16H 57/02004
                                                    74/399

(Continued)

FOREIGN PATENT DOCUMENTS

AU    2009217355 A1 * 10/2010   ........ B01L 3/502784
CN    101744766 A      6/2010

(Continued)

OTHER PUBLICATIONS

Bordelon, D.E. "Magnetic nanoparticle heating efficiency reveals magneto-structural differences when characterized with wide ranging and high amplitude alternating magnetic fields" (2011) J. Appl. Phys. 109, 124904.

(Continued)

*Primary Examiner* — Frantz F Jules
*Assistant Examiner* — Martha Tadesse
(74) *Attorney, Agent, or Firm* — Westman, Champlin & Koehler, P.A.; Amanda M. Prose

(57) ABSTRACT

Methods and vitrification systems for biological samples are provided. The vitrification system has a rotatable cryowheel (Continued)

(210) with a facing surface (220). Droplets of a composition that includes a biological sample are released onto the facing surface. Droplets are rapidly pulled beneath the surface of the cryogenic coolant (160) to generate vitrified samples (180). Methods and cryopreservation devices are also provided that incorporate the vitrification systems.

12 Claims, 11 Drawing Sheets

(56) References Cited

U.S. PATENT DOCUMENTS

| | | | |
|---|---|---|---|
| 5,780,295 | A | 7/1998 | Livesey et al. |
| 6,381,967 | B1* | 5/2002 | Craig .................. A01N 1/0257 34/284 |
| 7,112,576 | B1 | 9/2006 | Hubel |
| 8,790,923 | B2 | 7/2014 | Ennis et al. |
| 2005/0016198 | A1 | 1/2005 | Wowk et al. |
| 2009/0133410 | A1* | 5/2009 | Thorne ..................... G01N 1/42 62/51.1 |
| 2010/0003197 | A1 | 1/2010 | Bikram |
| 2010/0317108 | A1 | 12/2010 | Stojanov |
| 2011/0207112 | A1* | 8/2011 | Burbank .............. A01N 1/0252 700/282 |
| 2012/0087868 | A1 | 4/2012 | Todd et al. |
| 2012/0251999 | A1 | 10/2012 | Demirci et al. |
| 2012/0276334 | A1* | 11/2012 | Fedynyshyn ............ B05D 5/08 264/293 |
| 2015/0351381 | A1 | 12/2015 | Vom et al. |
| 2016/0015025 | A1 | 1/2016 | Bischof et al. |
| 2016/0021874 | A1 | 1/2016 | Mazur |
| 2017/0306288 | A1 | 10/2017 | Gale et al. |
| 2017/0350798 | A1 | 12/2017 | Carragher et al. |
| 2018/0192639 | A1 | 7/2018 | Brockbank et al. |
| 2019/0116783 | A1* | 4/2019 | Bischof ................ A01N 1/0231 |

FOREIGN PATENT DOCUMENTS

| | | | |
|---|---|---|---|
| CN | 102835389 A | 12/2012 | |
| CN | 104782616 A | 7/2015 | |
| CN | 104012521 B | 8/2015 | |
| CN | 205624138 U | 10/2016 | |
| CN | 107189940 A | 9/2017 | |
| EP | 2381236 A1 | 10/2011 | |
| JP | 2011 231021 A | 11/2011 | |
| WO | 2007/077560 A2 | 7/2007 | |
| WO | 2014/085801 A1 | 6/2014 | |
| WO | 2014/143961 A1 | 9/2014 | |
| WO | WO-2017184721 A1 * | 10/2017 | ........... A01N 1/0221 |
| WO | 2018/073242 A1 | 4/2018 | |

OTHER PUBLICATIONS

International Search Report issued for PCT/US2019/041366, dated Nov. 14, 2019.
Written Opinion of the International Searching Authority issued for PCT/US2019/041366, dated Nov. 14, 2019.
Choi, J. K., H. Huang, and X. He., "Improved low-CPA vitrification of mouse oocytes using quartz microcapillary." Cryobiology 70.3 (2015): 269-272.
Clark, N., and J. Swain, "oocyte cryopreservation: searching for novel improvement strategies" J Assist Peprod Genet (2013) 30:865-875.
Demirci, U. and G. Montesano, "Cell encapsulating droplet vitrification" Lab on a Chip, 2007. 7:1428-1433.
Fahy, G. M. et al., "Improved vitrification solutions based on the predictability of vitrification solution toxicity" Cryobiology (2004) 48:22-35.
Glavan, A. C. et al., "Electroanalytical devices with pins and threads" Lab on a Chip (2016) 16, 112-119.

He, X. et al., "Vitrification by ultra-fast cooling at a low concentration of cryoprotectants in a quartz micro-capillary: a study using murine embryonic stem cells." Cryobiology 56.3 (2008): 223-232.
Howe, K. et al., The zebrafish reference genome sequence and its relationship to the human genome. Nature (2013) 496:498-503.
Khosla, K. et al., "Gold Nanorod Induced Warming of Embryos from the Cryogenic State Enhances Viability" ACS NANO (2017) 11(8):7869-7878.
Khosla, K. et al., "Characterization of Laser Gold Nanowarming: A Platform for Millimeter-Scale Cryopreservation" Langmuir (2019) 35, 23, 7364-7375.
Koo, C., et al., "A Cryo-Cooling Microfluidic Channel Device for a Magnetic Resonance (MR) Microscopy System." (2010) 14th International Conference on Miniaturized Systems for Chemistry and Life Sciences, Oct. 3-7, 2010, Groningen, The Netherlands.
Lai, D. et al., "Microfluidics for Assisted Reproductive Technologies" Chap. 7 of Microfluidics for Medical Applications (2015).
Lai, D. et al., "Recent microfluidic devices for studying gamete and embryo biomechanics" Journal of Biomechanics (2015) 48, 1671-1678.
Lai, D. et al., "Slow and steady cell shrinkage reduces osmotic stress in bovine and murine oocyte and zygote vitrification" Human Reproduction (2015) vol. 30, No. 1, pp. 37-45.
Lee, W., P. Tseng, and C. Di Carlo, "Microtechnology for Cell Manipulation and Sorting" Microsystems and Nanosystems (2017) Springer International Publishing.
Li, S. et al., "On-Chip Cryopreservation of Living Cells" JALA: Journal of the Association for Laboratory Automation (2010) 15(2):99-106.
Mazur, P., S. Leibo, and G. E. Seidel, Jr., "Cryopreservation of the germplasm of animals used in biological and medical research: importance, impact, status, and future directions." Biology of reproduction, 2008. 78(1):2-12.
Metcalf, A. R. et al., "Interfacial Tensions of Aged Organic Aerosol Particle Mimics Using a Biphasic Microfluidic Platform" Environmental Science and Technology (2016) 50, 1251-1259.
Moldovan, N. I. et al., "Principals of Kenzan Method for Robotic Cell Spheroid-Based Three-Dimensional Bioprinting" (2017) Tissue Engineering: Part B, vol. 23, No. 3, 237-244.
Risco, R. et al., "Thermal performance of quartz capillaries for vitrification." Cryobiology (2007) 55:222-229.
Schier, A.F., "Genomics: Zebrafish earns its stripes" Nature (2013) 496(7446):443-444.
Shi, M. et al., "High-Throughput Non-Contact Vitrification of Cell-Laden Droplets Based on Cell Printing" Scientific Reports (2015) 5:17928.
Song, C. et al., "Modelling and optimization of micro optofluidic lenses" Lab on a Chip (2009) 9, 1178-1184.
Vig, A. L. and A. Kristensen, "Separation enhancement in pinched flow fractionation" Applied Physics Letters (2008) 93 (20):203507.
Warnock, G. et al., "Long-term follow-up after transplantation of insulin-producing pancreatic islets into patients with type 1 (insulin-dependent) diabetes mellitus" Diabetologia (1992) 35(1):89-95.
Xi, H. D. et al., "Active droplet sorting in microfluidics: a review." Lab on a Chip (2017) 17, 751-771.
Yamada, M. et al., "Pinched flow fractionation: continuous size separation of particles utilizing a laminar flow profile in a pinched microchannel" Analytical Chemistry (2004) 76(18):5465-5471.
Zhao, G. and J. Fu, "Microfluidics for cryopreservation" Biotechnology Advances (2017) 35(2):323-336.
Zhou, X. et al., "Investigation on the thermal performance of a novel microchannel-aided device for vitrification of cells/tissues" Applied Thermal Engineering (2017) vol. 119, pp. 189-196.
International Patent Application No. PCT/US17/17331, filed Feb. 17, 2017; International Search Report / Written Opinion issued May 8, 2017; 9 pages.
International Patent Application No. PCT/US17/17331, filed Feb. 17, 2017; International Preliminary Report on Patentability issued Aug. 30, 2018; 7 pages.
Patent Application No. PCT/US2014/028166, filed Mar. 14, 2014; International Preliminary Report on Patentability, issued Sep. 24, 2015; 9 pages.

(56) References Cited

OTHER PUBLICATIONS

Patent Application No. PCT/US2014/028166, filed Mar. 14, 2014; International Search Report and Written Opinion, issued Aug. 6, 2014; 14 pages.
Xi, H. et al. "Active droplet sorting in microfluidics: a review" Lab on a Chip (2017) 17, 751-771.
Yong, "Green, biodegradable, underwater superoleophobic wood sheet for efficient oil/water separation." ACS omega 3.2 (Feb. 1, 2018): 1395-1402.
Examination Report issued for related EP patent application serial No. 17753905.3, dated Oct. 12, 2020.
Albert, "The effect of temperature and freeze-thaw processes on gold nanorods" Dec. 2009 Nanotechnology 20 (50):505502. 6pgs.
Bearer, "A Simple Method for Quick-Freezing" 1986 J Electron Microsc Tech 3(2): 233-241.
Belete, "Novel aqueous nano-scaled formulations of oleic acid stabilized hydrophobic superparamagnetic iron oxide nanocrystals" Feb. 2013 Drug Development And Industrial Pharmacy, 39(2): 186-196.
Cao, Z. et al. "Droplet sorting based on the No. of encapsulated particles using a solenoid valve" Lab on a Chip (2013) 13, pp. 171-178.
Choi, "Review of biomaterial thermal property measurements in the cryogenic regime and their use for prediction of equilibrium and non-equilibrium freezing applications in cryobiology" 2010 Cryobiology, 60(1):52-70.
Daly et al., "Successful cryopreservation of coral larvae using vitrification and laser warming," Scientific Reports, 2018, 8(1):15714. Published online Oct. 24, 2018.
De Graaf, "Cryopreservation of rat precision-cut liver and kidney slices by rapid freezing and vitrification." Cryobiology, 2007. 54(1): p. 1-12.
Deng, "Rapid electromagnetic rewarming of cryopreserved tissues using nano-magnetoparticles feasibility study" 2008 Proceedings of the 2nd International Conference on Integration and Commercialization of Micro and Nanosystems, 427-428.
Etheridge, "Radiofrequency heating of magnetic nanoparticle cryoprotectant solutions for improved cryopreservation protocols" 2013 Cryobiology, 67:398-399.
Etheridge, "RF heating of magnetic nanoparticles improves the thawing of cryopreserved biomaterials" Oct. 2014 Technology, 2(03):229-242.
Fahy, "Improved vitrification solutions based on the predictability of vitrification solution toxicity" 2004 Cryobiology 48 (1):22-35.
Frazier, "Effects of Heating Temperature and Duration by Gold Nanorod Mediated Plasmonic Photothermal Therapy on Copolymer Accumulation in Tumor Tissue" 2015 Mol. Pharmaceut., 12:1605-1614.
Goiti, "Effect of magnetic nanoparticles on the thermal properties of some hydrogels" 2007 Polymer Degradation And Stability, 92:2198-2205.
Graf, S. F. et al. "Image-Based Fluidic Sorting System for Automated Zebrafish Egg Sorting into Multiwell Plates" JALA (2011) 16, pp. 105-111.
Hagedorn, "Characterization of a Major Permeability Barrier in the Zebrafish Embryo" 1998 Biology of reproduction, 59(5):1240-1250.
Hagedorn, "Magnetic resonance microscopy and spectroscopy reveal kinetics of cryoprotectant permeation in a multicompartmental biological system" 1996 Proceedings of the National Academy of Sciences, 93(15):7454-7459.
Hagedorn, "Water distribution and permeability of zebrafish embryos, Brachydanio rerio" 1997 Journal of Experimental Zoology, 278(6):356-371.
Hagedorn, "Zebrafish reproduction: revisiting in vitro fertilization to increase sperm cryopreservation success" 2011 PloS one, 6(6):e21059.
Hagedorn, "High ice nucleation temperature of zebrafish embryos: slow-freezing is not an option" 2004 Cryobiology, 49(2):181-189.
Halmagyi, "Cryopreservation of Chrysanthemum morifolium (*Dendranthema grandiflora* Ramat.) using different approaches",
Plant Cell Reports, vol. 22, No. 6, (Jan. 1, 2004), pp. 371-375, XP55737332, DOI: 10.1007/S00299-003-0703-9.
Hashemi, N. et al. "Microflow cytometer for optical analysis of phytoplankton." Biosensors Bioelectronics, 26 (2011), pp. 4263-4269.
Hou, "Magnetic nanohydroxyapatite/PVA composite hydrogels for promoted osteoblast adhesion and prolyferation" Mar. 2013 Colloids And Surfaces B: Biointerfaces, 103(1):318-325.
Huh, D. et al. "Microfluidics for flow cytometric analysis of cells and particles." Physiol Measur, 26 (2005), pp. R73-R98.
Imaging Flow Cytometry. https://www.luminexcorp.com/imaging-flow-cytometry/, accessed Jun. 2019.
International Patent Application No. PCT/US17/28351 filed Apr. 19, 2017; International Search Report / Written Opinion issued Jul. 7, 2017; 14 pages.
International Patent Application No. PCT/US17/28351 filed Apr. 19, 2017; International Preliminary Report on Patentability issued Oct. 23, 2018; 7 pages.
International Patent Application No. PCT/US20/13956, filed Jan. 16, 2020; International Search Report / Written Opinion issued Jun. 2, 2020.
International Search Report and Written Opinion issued for PCT/US2020/019692, dated May 22, 2020.
Janik et al., "Overcoming a permeability barrier by microinjecting cryoprotectants into zebrafish embryos (*Brachydanio rerio*)," Cryobiology, 2000, 41(1):25-34.
Janik, "Microinjection of cryoprotectants into the yolk of zebrafish embryos (*Brachydanio rerio*)" 2000 Biol Reprod, 62:146.
Jin, "High survival of mouse oocytes/embryos after vitrification without permeating cryoprotectants followed by ultra-rapid warming with an IR laser pulse" Mar. 2015 Sci Reports, 5(9271):6 pgs.
Jin, "Survivals of mouse oocytes approach 100% after vitrification in 3-fold diluted media and ultra-rapid warming by an IR laser pulse" 2014 Cryobiology, 68(1):419-430.
Khosla, "Cryopreservation of Zebrafish Embryos: New Approach" IEM poster, Sep. 21, 2015. 1 pg.
Khosla, "Modeling Laser Heating of Zebrafish Embryos Containing Gold Nanoparticles (GNP)" NEMB poster, Apr. 17, 2015. 1 pg.
Kleinhans, "Physical Parameters, Modeling, and Methodological Details in Using IR Laser Pulses to Warm Frozen or Vitrified Cells Ultra-Rapidly" 2015 Cryobiology, 70(2):195-203.
Kleinhans, "Simple. inexpensive attainment and measurement of very high cooling and warming rates" 2010 Cryobiology, 61(2):231-233.
Mazur, "Survival of mouse oocytes after being cooled in a vitrification solution to -196° C. at 95° to 70,000° C./min and warmed at 610° to 118,000° C./min: A new paradigm for cryopreservation by vitrification" Feb. 2011 Cryobiology, 62 (1):1-7.
Manuchehrabadi, "Improved tissue cryopreservation using inductive heating of magnetic nanoparticles" Sci Transl Med. Mar. 1, 2017; 9(379): 9:eaah4586.
Manuchehrabadi, "Nanowarming of Tissues", Cryobiology, (Dec. 1, 2016), but presented earlier on Jul. 26, 2016 during meeting CRYO2016), pp. 399-443, XP055386203, DOI: 10.1016/j.cryobiol. 2016.09.091.
Moscoso-Londono, "Structural and magnetic behaviour of ferrogels obtained by freezing thawing of polyvinyl alcohoVpoly(acrylic acid)(PAA)-coated iron oxide nanoparticles" Feb. 2, 2013 European Polymer Journal, 49(2); 279-289.
Polyak, "High field gradient targeting of magnetic nanoparticle-loaded endothelial cells to the surfaces of steel stents" 2008 PNAS, I 05(2), 698-703.
Prow, "Ocular nanoparticle toxicity and transfection of the retina and retinal pigment epithelium" 2008 Nanomedicine: Nanotechnology, Biology And Medicine, 4:340-349.
Qin, "Thermophysical and biological responses of gold nanoparticle laser heating" 2012 Chemical Society Reviews, 41(3):1191-1217.
Rios, "Thermal Expansion of blood vessels in low cryogenic temperatures, Part II: Vitrification with VS55, DP6, and 7.05 M DMSO" 2006 Cryobiology, 52(2):284-294.

(56) References Cited

OTHER PUBLICATIONS

Rypka, "A novel simplified ultra-rapid freezing technique for cryopreservation of tissue slices", Cryobiology, vol. 52, No. 2 (Apr. 1, 2006), pp. 193-199, XP024943396, DOI: 10.1016/j.cryobiol. 2005.10.012.
Said et al. Utility of Magnetic Cell Separation as a Molecular Sperm Preparation Technique, Journal of Andrology, vol. 29, No. 2, Mar./Apr. 2018.
Spencer, D. et al. "A sheath-less combined optical and impedance microcytometer" Lab on a Chip (2014) 14, pp. 3064-3073.
Stan, C. A. et al. "A microfluidic apparatus for the study of ice nucleation in supercooled water drops" Lab on a Chip (2009) 16, pp. 2253-2408.
Stavrakis, S. et al. "High-throughput microfluidic imaging flow cytometry" Current Opinion in Biotechnology (2019) 55, pp. 36-43.
Wang, "Numerical simulation of the effect of superparamagnetic nanoparticles on microwave rewarming of cryopreserved tissues" Feb. 13, 2014 Cryobiology, 68:234-243.

\* cited by examiner

… (1)

HIGH THROUGHPUT SYSTEM FOR PRODUCTION AND VITRIFICATION OF BIOMATERIALS IN CRYOPROTECTANT DROPLETS

CROSS-REFERENCE TO RELATED APPLICATION

This Application is a Section 371 National Stage Application of International Application No. PCT/US2020/019692, filed Feb. 25, 2020 and published as WO 2020/176498 A1 on Sep. 3, 2020, in English, which claims priority to U.S. provisional patent application Ser. No. 62/811,847, filed Feb. 28, 2019, the contents of which are hereby incorporated by reference in their entirety.

BACKGROUND

Preservation of biological material is valuable in many areas including genetic research, aquaculture development, and biodiversity preservation. The need to preserve germplasm has become especially urgent in aquatic ecosystems due to coastal pollution, over-fishing, climate change, and acidifying oceans. Today, about 80% of marine fish stocks are over-exploited, and researchers now list freshwater fish species as one of the most threatened groups of vertebrates on the planet. Most coral species are under threat of extinction within decades to centuries.

Maintaining all of these valuable genotypes in vivo at normal habitat temperature is expensive, risky, and beyond the capacity of even the largest stock centers. Moreover, the difficulty and expense of transporting live populations make multi-institutional research on genetically identical specimens rare.

SUMMARY

Cryopreservation of germplasm of many important species is currently not possible. Examples include the embryos and oocytes of several vertebrate models such as zebrafish and *Xenopus laevis,* and endangered species such as coral and turtles. These species are of great interest to medical researchers, physiologists, and conservationists. Over the past decade, for example, researchers have increasingly studied and modified the genetic backbone of the vertebrate model system of the zebrafish.

An important way to safeguard unique and endangered species will be the creation of frozen germplasm banks, which can retain viability for years or even centuries with minimal, survivable DNA damage. These banks offer samples of preserved and protected genetic pools that can be used to 'seed' shrinking populations all over the world, refreshing genetic diversity and promoting adaptability to changing conditions. Cryogenic techniques allow for the easy and inexpensive transportation of genetic materials among living and/or managed populations. They vastly improve access to biomaterials and model organisms for scholarly research. Finally, cryopreservation of embryos offers the possibility of the future de-extinction of species that become extinct in nature but remain preserved in cryogenic storage.

In one aspect, the present description relates to a vitrification system. The system includes a rotatable cryowheel comprising a porous facing surface. The facing surface of the cryowheel may lightly adhere droplets when the droplets are released onto a facing surface of the cryowheel as the cryowheel emerges above the level of a cryogenic coolant in a cryogenic container. The droplets can include a biological sample. The rotation of the cryowheel submerges the droplets of the biological sample on the facing surface into the cryogenic coolant. The material for the facing surface of the cryowheel may be selected from the group consisting of balsa wood, polystyrene foam, and ethylene vinyl acetate foam. The facing surface of the cryowheel may be balsa wood. The cryowheel may be within a cryogenic container. The vitrification system may include apparatus to drive the rotation of the cryowheel. The apparatus may be a stepper motor. The facing surface may be above the level of the cryogenic coolant for less than about 10 seconds. The system may include a scraper for detaching the vitrified biological sample from the facing surface. The system may include a tray, wherein the tray is configured to receive the vitrified biological sample. The droplets may include cryoprotectants and laser absorbers. The cryowheel may include gears for engaging a driving system for rotation. The biological sample may be selected from zebrafish embryos, pancreatic islets, *Xenopus* oocytes, *C. elegans,* germplasm, coral germplasm, coral larvae, mammalian tissue, mammalian germplasm, bacteria or protozoans. The biological sample may be less than about 1 mm in diameter. The biological sample may be between about 10 µm and about 1000 µm in diameter.

In another aspect, the present description relates to a method for vitrification of a biological sample. The method includes releasing droplets comprising a biological sample in a cryoprotectant composition onto the facing surface of a rotatable cryowheel of a vitrification system, wherein the facing surface is porous and lightly adheres the released droplets. The method includes rotating the cryowheel continuously. The cryowheel may be substantially submerged in a cryogenic coolant. The droplets are released onto the facing surface when the facing surface emerges from the cryogenic coolant. The droplets are submerged or pulled into the cryogenic coolant by the rotation of the cryowheel to form a vitrified biological sample. The method may include maintaining the integrity of the droplets when the droplets are submerged into the coolant. The droplets may not be absorbed by the facing surface. The method further includes dislodging the vitrified biological sample from the facing surface. The vitrified biological sample may be dislodged into a tray in the cryogenic coolant. The method may include submerging greater than about 95 percent of the cryowheel in the cryogenic coolant during rotation of the cryowheel. The method may include rotating the cryowheel at about 3 to about 12 revolutions per minute (RPM). The method may include submerging the droplet within about 5 seconds after release onto the facing surface. The material for the facing surface of the cryowheel may be selected from the group consisting of balsa wood, polystyrene foam, or ethylene vinyl acetate foam. The biological sample may be selected from zebrafish embryos, pancreatic islets, *Xenopus* oocytes, *C. elegans,* germplasm, coral germplasm, mammalian tissue, mammalian germplasm, bacteria or protozoans. The biological sample may be coral larvae. The droplets may be less than about 5 µl in volume. The droplets further may include cryoprotectants and laser absorbers.

In a further aspect, the present description relates to a cryopreservation device. The cryopreservation system includes at least two input ports and a mixing system including tubing with an inlet end and an outlet end, wherein the inlet end is operably connected to the first port and the second port, wherein the tubing is configured to mix compositions entering from the inlet ports and as the compositions traverse the tubing from the inlet end to the outlet end.

The system also includes a droplet production head comprising a nozzle with a tip and an actuator, the nozzle operably attached to the outlet end of the tubing in the mixing system and the actuator configured to tap the side of the nozzle at set intervals to dislodge a consistent sized droplet of the combined composition from the tip of the nozzle. The system also includes a rotatable cryowheel including a porous facing surface, wherein the facing surface of the cryowheel lightly adheres the droplets of the composition when released onto the facing surface of the cryowheel as the cryowheel emerges above the level of a cryogenic coolant in a cryogenic container, wherein rotation of the cryowheel submerges the droplets of the composition into the cryogenic coolant, wherein the droplets comprise a biological sample. The mixing system may be a serpentine mixing system. The serpentine mixing system may include at least three vertical posts configured to retain the tubing in a serpentine configuration, promoting the thorough mixing of the compositions introduced into the mixing system. The serpentine mixing system is configured to dispose the tubing on a level plane and to prevent biological samples of density different from the density of surrounding composition from accumulating in low or high points of the tubing. The actuator may be a solenoid actuator. The system can include apparatus for driving the input ports, the mixing system, generating the droplets and/or the vitrification system of the cryopreservation system.

In yet a further aspect, the present description relates to a method for cryopreservation of a biological sample. The method includes transferring a first composition comprising cryoprotectants and laser absorbers into a first port and transferring a second composition comprising a biological sample in a fluid into a second port of a cryopreservation device, wherein the cryopreservation device further comprises a mixing system comprising tubing with an inlet end and an outlet end, wherein the inlet end is operably connected to the first port and the second port, wherein the tubing is configured to mix compositions entering from the inlet ports. The method also includes mixing the first and second compositions in the mixing system as the compositions traverse the tubing from the inlet end to the outlet end to form a pre-vitrification composition at the outlet end. The method also includes rotating the cryowheel and releasing droplets of the pre-vitrification composition from the droplet production head at regular intervals onto the facing surface of a cryowheel that is above the level of a cryogenic coolant in a cryogenic container. The cryowheel may be substantially submerged in a cryogenic coolant. The method also includes continuing to rotate the cryowheel to submerge or pull the facing surface with the droplets into the cryogenic coolant within the cryogenic container. The method may include a fixed duration of the biological sample in the cryopreservation device entering the inlet end of the mixing system to the release of the droplets onto the facing surface of the cryowheel. The duration may be less than about 60 seconds. The method may include detaching the droplets from the facing surface with a scraper to release a vitrified biological sample into the cryogenic coolant. The method may further include collecting the vitrified biological sample in a tray submerged in the cryogenic coolant.

DETAILED DESCRIPTION OF ILLUSTRATIVE EMBODIMENTS

Figure 1:
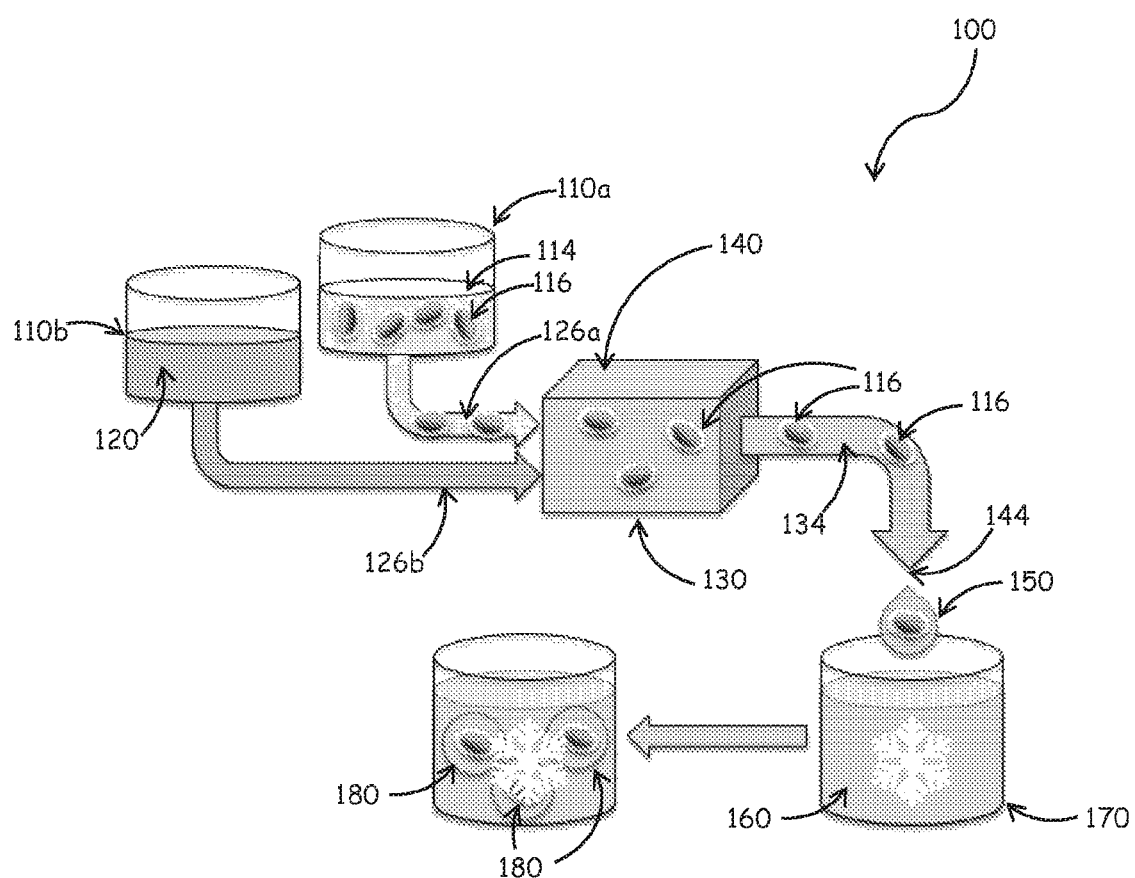
FIG. 1 is a schematic diagram of a method of a high-throughput cryopreservation device.

The present description includes systems and methods for vitrification of biological samples. The vitrification systems described herein can include a rotatable cryowheel. The cryowheel can be continuously rotating during use of the vitrification system. The cryowheel can be substantially submerged in a cryogenic coolant during vitrification of a sample. During rotation of the cryowheel, a small portion of the facing surface of the cryowheel is generally above the level of the cryogenic coolant in a cryogenic container. The cryowheel can be continuously rotated resulting in a portion of the facing surface rising briefly above the coolant level before becoming submerged again in the coolant as the rotation continues. The facing surface of the cryowheel can be faced with balsa wood or another similar suitable material, to receive droplets of a biological sample in a cryoprotective composition. The droplets can adhere slightly to the facing surface and can be immediately pulled under the surface of a cryogenic coolant such as liquid nitrogen by the continuous rotation of the wheel.

Droplets that include a biological sample in a cryoprotectant composition can be released onto a portion of the porous facing surface of the cryowheel above the liquid coolant level. The portion of facing surface above the liquid coolant level can be maintained at a cryogenic temperature by limiting the rise of the facing surface above the coolant level to a duration and elevation that does not allow the coolant to completely boil off from the facing surface. This can be achieved by not allowing the portion of the facing surface above the coolant level to protrude above the layer of cold coolant vapor that forms between the surface of the liquid coolant and the plane of the opening of the insulated vessel containing the liquid coolant. This layer of cold coolant vapor can form naturally by the continuous boiling of the coolant. When droplets are allowed to fall from above the insulated vessel onto the portion of the facing surface of the cryowheel that is above the surface level of the liquid coolant, the droplets can mildly adhere to the porous facing surface. These lightly adhered droplets can be quickly pulled below the surface of the cryogenic coolant by the rotation of the cryowheel, resulting in a rapid cooling of the droplet in which the biological sample is suspended. This rapid cooling of the biological sample can lead to higher rates of vitrified samples with reduced frequency and extent of crystallization during cooling of the biological samples. Submersion of the droplets on a cryowheel advantageously can allow the droplets to cool more efficiently and reduces formation of crystals within the droplets. In addition, this system can allow for a high throughput of sample vitrification and with low levels of cryoprotective agents.

The present description also includes cryopreservation devices and methods for cryopreservation of a biological sample. The cryopreservation device can include transfer of biological material and cryoprotectant composition into a mixing system. The mixing system can be a serpentine mixing system. The mixed composition can be transferred to a droplet generating system. The droplets are then released onto the facing surface of a cryowheel of vitrification systems described herein.

In one exemplary embodiment of a method for cryopreservation, the cryopreservation device can be used to mix a cryoprotectant solution containing gold nanorods with seawater containing coral larvae, dispensing the resulting mixture as droplets of consistent volume, and vitrifying the droplets by pulling them under the surface of a bath of liquid nitrogen by means of a rotating wheel to which the droplets adhere. This method can produce well-vitrified droplets of consistent volume that can be stored at cryogenic temperatures and can be later warmed by a laser, allowing the recovery of live larvae in the process.

High-throughput vitrification of biological material, for example, coral larvae, cells and aggregates (e.g. pancreatic islets), embryos or oocytes (e.g. other vertebrate biomedical models) and commercially relevant or endangered species (e.g. those of interest in agriculture, aquaculture and biodiversity conservation) can be performed using the systems and methods described herein. Cryopreservation of germplasm of aquatic species is increasingly vital for biomedical research, aquaculture and maintenance of biodiversity. In some exemplary embodiments, biological material that can be cryopreserved can include, for example, embryos and oocytes of fish and amphibians. Well-established, reproducible cryopreservation of biological material can provide a unique opportunity to preserve and expand the use of important biological material.

Successful cryopreservation protocols for biological material may be grouped into two broad methods. These can include slow freezing and vitrification. In both methods, the biological material that is intended to be cryopreserved may not undergo a first-order phase transition from the liquid to the crystalline solid state, but instead can undergo a glass transition, in which no long-range crystalline structure is present in the final solid-like state. A term often used for this glass transition is vitrification. The two cryopreservation methods can differ in how they achieve this glass transition in the biological material. Although both methods ultimately achieve vitrification of the biological material, throughout this document the term "vitrification" is used to mean the cryopreservation method that achieves vitrification by glass transition of both the biological material and its entire surrounding solution.

In slow freezing, a large fraction of the volume of the aqueous cryoprotectant solution in which the biological material is suspended is allowed to undergo a first-order phase transition from the liquid to the crystalline solid state, while the biological material itself and the aqueous cryoprotectant solution immediately surrounding the biological material undergo a glass transition. No successful slow freezing protocol has been developed to date for many biological materials, including coral larvae.

In vitrification, both the aqueous cryoprotectant solution and the biological material suspended in it can undergo a glass transition. This can be achieved principally by the application of extremely high cooling rates to a sample of biological material in a solution with high concentrations of cryoprotective agents. Both an increased rate of cooling and an increased concentration of cryoprotective agents can favor successful vitrification. However, an increased concentration of cryoprotective agents may be irremediably toxic to the biological material.

A sample that is successfully vitrified can be warmed without allowing the glassy state to relax to a crystalline state, a transition that can be thermodynamically favorable but can be lethal to the vitrified biological material. To prevent this transition, the rate of warming can be extremely high. Successful warming of a vitrified sample may be achieved by inclusion of gold nanorods or other laser-absorbent material in a sample prior to vitrification. When a vitrified sample is removed from a cryogenic environment that includes cryogenic liquid or vapor, the vitrified sample may then be immediately exposed to a brief pulse of laser light. The laser light can be absorbed by the laser-absorbent material and converted to heat. The heat can then be conducted into the entire volume of the sample. A vitrified sample may thereby be warmed from cryogenic temperatures to room temperature in the space of a few milliseconds. This can result in a vitrified sample that can be warmed to room temperature without the transition to a crystalline state.

The undesirable phase transition to a crystalline state can have three characteristics. First, it can entail a realignment of molecules into an organized crystalline structure that can destroy biological constituents such as membranes and DNA either by breaking chemical bonds, or by mechanical forces, or both. Second, it can release the latent heat of fusion, slowing the cooling rate of a sample if it occurs on cooling. Third, it can begin with a nucleation event wherein an organized nucleus of molecules forms stochastically, constituting a seed on which additional molecules can align, growing the nucleus and forming the new crystalline solid state. This third property, whereby nucleation is a necessary precursor to formation of the crystalline state, may be suppressed by a high rate of cooling and/or by the inclusion of cryoprotective agents in a sample.

Although methods are known for cryopreservation by vitrification of small biological samples, i.e. less than about 0.1 µl droplets, cryopreservation of larger samples has been challenging. Problems related to crystallization of the droplets can adversely affect the sample and/or destroy the sample. Crystallization of the biological sample during cooling and/or warming can lead to disruption of the cellular membranes and other structures that can destroy the integrity of the sample. Similarly, when warming larger cryopreserved biological samples, i.e. greater than 0.1 µl, uneven warming can lead to destruction of the integrity of the sample and lower sample survival rates.

The systems, methods and compositions described herein are useful in, for example, vitrifying biological samples such as, for example, zebrafish embryos, marine germplasm, coral larvae and/or other 10 micrometer to millimeter-sized model systems. The vitrification system described herein advantageously can be used in methods to process biological samples for long-term storage by cryopreservation and also rewarming of the cryopreserved material. High-throughput techniques can be adapted for processing a large number of samples for vitrification and cryopreservation.

The systems described herein can be used to attain the critical cooling rates (CCR) and critical warming rates (CWR) needed for physical (no crystallization) and biological (no toxicity) cryopreservation success in biological samples. The systems and methods described herein can preserve the integrity of the biological samples for successful warming at a future desired time.

Definitions

Various terms are defined herein. The definitions provided below are inclusive and not limiting, and the terms as used herein have a scope including at least the definitions provided below.

The terms "preferred" and "preferably", "example" and "exemplary" refer to embodiments that may afford certain benefits, under certain circumstances. However, other embodiments may also be preferred or exemplary, under the same or other circumstances. Furthermore, the recitation of one or more preferred or exemplary embodiments does not imply that other embodiments are not useful, and is not intended to exclude other embodiments from the inventive scope of the present disclosure.

The singular forms of the terms "a", "an", and "the" as used herein include plural references unless the context clearly dictates otherwise. For example, the term "a tip" includes a plurality of tips.

Reference to "a" chemical compound refers to one or more molecules of the chemical compound, rather than being limited to a single molecule of the chemical compound. Furthermore, the one or more molecules may or may not be identical, so long as they fall under the category of the chemical compound.

The terms "at least one" and "one or more of" an element are used interchangeably, and have the same meaning that includes a single element and a plurality of the elements, and may also be represented by the suffix "(s)" at the end of the element.

The terms "about" and "substantially" are used herein with respect to measurable values and ranges due to expected variations known to those skilled in the art (e.g., limitations and variability in measurements).

The term "and/or" means one or all of the listed elements or a combination of any two or more of the listed elements.

The terms "comprises," "comprising," and variations thereof are to be construed as open ended—i.e., additional elements or steps are optional and may or may not be present.

Unless otherwise specified, temperatures referred to herein are based on atmospheric pressure (i.e. one atmosphere).

"Cryopreservation" as referred to herein relates to preservation of a biological sample at cryogenic temperatures. Cryopreservation includes cooling/freezing/vitrifying the biological sample below subzero temperatures in order to shut down metabolic/chemical activity, thereby allowing long term storage of biomaterials. Cryopreservation of a biological sample may also include warming the biological sample to recover the function/activity of the biological sample.

"Cryogenic" or "Cryogenic temperature" as referred to herein relates to a temperature below sub-zero. Cryogenic temperature can be from −80° C. (−112° F.) to absolute zero (−273° C. or −460° F.).

"Cryogenic coolant" as referred to herein relates to a substance that is at a cryogenic temperature, e.g. liquid nitrogen. It will be understood that reference to liquid nitrogen in the disclosure herein is exemplary and that other cryogenic coolants may also be used and are within the scope of this description.

"Insulated vessel" or "cryogenic container" can be used interchangeably and as referred to herein relate to a vessel/container that is amenable to retain a cryogenic coolant.

"Vitrification" or "glass transition" as referred to herein relates to a transition of a liquid to an amorphous solid state in which little or no long-range crystalline structure is present. This is contrasted with the transition of a liquid to a crystalline solid state, which implies undergoing a phase transition that releases the latent heat of fusion. Vitrification may be achieved by any number of methods. Vitrification, for example, can be achieved by the presence of cryoprotective solution, by the osmotic extraction of water from biological material suspended in the cryoprotective solution, by the introduction of permeating cryoprotective solution into the biological material, by removing substances that promote crystal formation or blocking their crystal-forming properties, and/or by very rapid cooling. Vitrified samples can have less than about 0.1% V/V of ice crystallization in the sample. Vitrification can prevent the formation of lethal ice that can destroy the viability of biological material.

"Glass" and "glassy" as referred to herein relate to a substance that has undergone vitrification.

"Liquid nitrogen" as referred to herein relates to liquid-phase nitrogen, which under standard temperature and pressure conditions remains at −196° C. and boils off continuously, producing very cold gaseous-phase nitrogen that is released to the environment.

"Leidenfrost effect" as referred to herein relates to the cushion of gaseous-phase nitrogen that surrounds an object much warmer than liquid nitrogen when the object is placed in liquid nitrogen or liquid nitrogen is poured over the object. It is produced by rapid boiling of the liquid nitrogen in response to the presence of the warmer object. It insulates the object from direct contact with the liquid nitrogen and so greatly decreases the rate at which the object cools to the temperature of liquid nitrogen.

"Crystallized" or "devitrified" sample as referred to herein relate to a biological sample that has attained some crystalline structure upon cooling, warming, or transient warming followed by cooling, and may not produce a viable biological sample upon warming to room or physiological temperature.

"Submerged" and/or "submerged droplets" as referred to herein relates to droplets that are below the surface of the cryogenic coolant.

"High-throughput" as referred to herein relates to the use of automation of a system to rapidly process a large number of samples in a short amount of time.

"Germplasm" as referred to herein relates to living genetic resources that are maintained for the purpose of animal and plant breeding, preservation and other uses.

"Biological specimens," "biological samples," and "biological materials" are used interchangeably and as referred to herein relate to cells, germplasm, cell aggregates (e.g.

pancreatic islets), embryos, oocytes, larvae and the like. The germplasm can be from a variety of species including, for example, coral germplasm/larvae, mammalian germplasm and the like. The biological samples can be unicellular organisms such as bacteria, protozoans and the like. The embryos and oocytes can be, for example, from fish, amphibians, mammals, humans and other vertebrates. The biological samples can be related to commercially relevant or endangered species (e.g. those relevant to agriculture, aquaculture and biodiversity).

"Droplet" as referred to herein includes a biological sample within the droplet. The droplet can further include cryoprotective agent(s), laser absorbers, sea water, a buffer or medium and/or other agents to aid in the cryopreservation. The size of the biological sample may be characterized by the diameter of the sample and/or the volume of the droplet.

"Larva" as referred to herein relates to an early life stage of a coral. The larva is a free-swimming young coral that will later attach to a substrate, metamorphose, and become an adult colony. The systems described herein may be described with reference to coral larvae, but wherever "larva/larvae/larval" is read in this document, it must be understood to mean any biological material, gamete, embryo, tissue sample, cell, or the like that is found suited to be vitrified by the methods described herein.

"Cryoprotective solution" and "cryoprotective composition" are used interchangeably and as referred to herein relate to a composition that protects a biological sample during vitrification and cryopreservation. Cryoprotectant solution can include, for example, a solution of dimethyl sulfoxide (DMSO), propylene glycol (PG), trehalose, and phosphate-buffered saline (PBS). This list of chemicals is non-exhaustive and the exact composition of the solution can vary according to the biological material that is being vitrified.

"Cryoprotective" and "cryoprotectant" can be used interchangeably.

"Pre-vitrification composition" as referred to herein relates to a composition that includes a biological sample in a cryoprotective composition. Droplets can be generated from the pre-vitrification composition for vitrification and cryopreservation using a variety of techniques.

"Lightly adheres" as referred to herein relates to liquid-phase droplets released onto a facing surface of the cryowheel, upon which the droplets adhere in a manner that maintains the roughly spherical shape of the droplets as they vitrify, prevents the droplets from coming loose from the facing surface when exposed directly to liquid-phase cryogenic coolant, and allows the droplets to be removed with little force. "Little force" as referred to herein relates to the force that may be exerted, for example, by brushing the facing surface with a bamboo skewer by hand, or by incorporating a stationary scraper into the device in the path of the droplets as they rotate, thereby breaking the droplets' adhesion to the facing surface without damage resulting to the facing surface.

"Laser absorbers" as referred to herein relate to materials that assist in the warming of a cryopreserved sample to improve viability of the warmed biological sample.

"Gold nanorods" as referred to herein are one example of a laser absorber. Gold nanorods can include, for example, gold rods of diameter 18±2 nm and length 111±11 nm, a combination of dimensions that optimally absorbs 1064 nm laser light. Other laser-absorbing materials are also known and are also within the scope of this description.

"Laser warming" as referred to herein is the induction of even and reproducible warming throughout a vitrified droplet of solution in which gold nanorods or other laser-light-absorbent materials are suspended, when the droplet is exposed to a brief pulse of laser light immediately after removal from cryogenic liquid or vapor. Laser warming returns the cryopreserved sample from the storage temperature of −196° C. to approximately room temperature in a few milliseconds, avoiding lethal ice formation during warming by virtue of the high rate of warming.

"Cryowheel" as referred to herein relate to a component in vitrification systems described herein. Droplets of a biological sample to be cryopreserved can be placed on the facing surface of a cryowheel to obtain a vitrified biological sample with minimal to no crystallization. It will be understood that vitrification systems will be described with reference to a cryowheel but features such as the shape, size, and the like may be modified and are all within the scope of this description.

In the following detailed description of illustrative examples, reference is made to specific embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the examples in which they are incorporated, do not limit other embodiments, and any reference to the elements, operation, and application of the examples serves only to define these illustrative examples. Features or elements shown in various examples described herein can be combined in ways other than shown in the examples, and any such combination is explicitly contemplated to be within the scope of the examples presented here. The following detailed description does not, therefore, limit the scope of what is claimed.

All patents, publications or other documents mentioned herein are incorporated by reference.

The present description can include cryopreservation of biological samples as shown, for example, schematically in FIG. 1. The diagram in FIG. 1 is an exemplary embodiment of a high throughput cryopreservation of biological samples. In one embodiment, cryopreservation can be carried out with system 100 that includes holding vessels 110a and 110b. Holding vessel 110a can include biological sample 116 in a liquid 114. Liquid 114 can be, for example, seawater. Liquid 114 can also be, for example, buffers and other physiologically acceptable media. Holding vessel 110b can include cryoprotective composition 120. Cryoprotective composition 120 can include, for example, a solution of dimethyl sulfoxide (DMSO), propylene glycol (PG), trehalose, and phosphate-buffered saline (PBS). Cryoprotective composition 120 can also include laser absorbers such as gold nanorods. Cryoprotective compositions are described in greater detail below.

Figure 7:
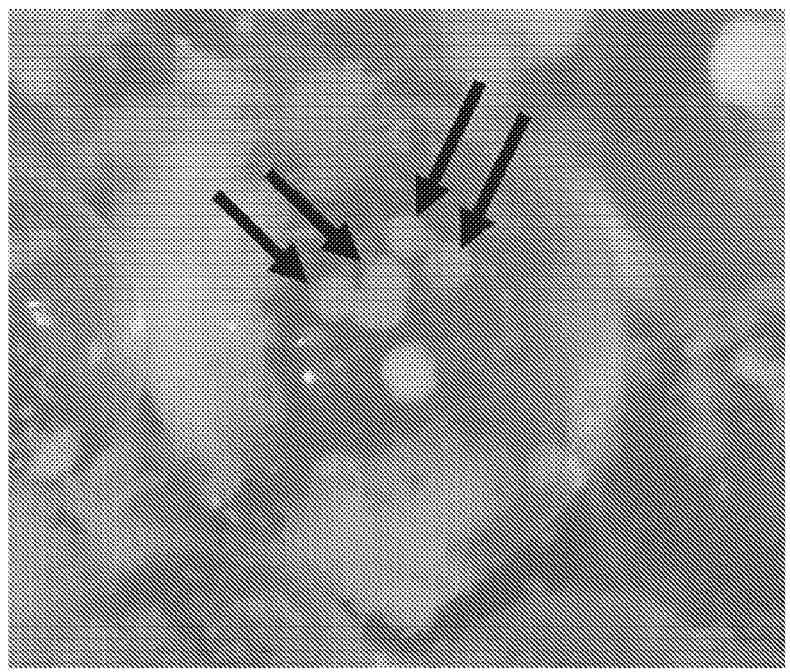
FIG. 7 is a photograph of coral larvae (indicated by arrows) frozen into spherical microliter droplets of cryoprotectant composition.

The contents of holding vessels 110a and 110b can be combined in mixing vessel 130. Mixing vessel 130 can be, for example, tubing configured to enable millifluidic mixing of cryoprotectant composition 120 with sample 116 and liquid 114. The mixing may be at a fixed flow rate. Pre-vitrification composition 134 with sample 116 exits mixing vessel 130 as droplets 150. Droplets 150 exiting mixing vessel 130 may be consistently sized. Droplets 150 can be vitrified in cryogenic coolant 160 held in cryogenic container 170. Vitrified samples 180 can be stored long-term at cryogenic temperatures for future conservation use. FIG. 7 is a photograph of one embodiment of vitrified coral larvae frozen into spherical microliter droplets of cryoprotectant composition described herein.

By consistently sized, it is meant that at least about 50% of droplets can be within ±20% of the volume of an ideal and/or desired droplet size as determined for the particular application. In some embodiments, at least about 50% of droplets may be within ±10% of the volume of an ideal and/or desired droplet size as determined for the particular application. In some embodiments, at least about 50% of droplets may be within ±5% of the volume of an ideal and/or desired droplet size as determined for the particular application. In some embodiments, at least 75% of droplets, or at least 90% of the droplets or at least 95% of the droplets are within ±20% of the volume of an ideal and/or desired droplet size, or within ±10% of the volume of an ideal and/or desired droplet size, or within ±5% of the volume of an ideal and/or desired droplet size.

In one exemplary embodiment, the desired droplets can be about 1 µl in volume and the droplets can be considered to be consistently sized if more than 50% of the droplets produced in continuous operation are between about 0.8 µl and about 1.2 µl.

Figure 2A:
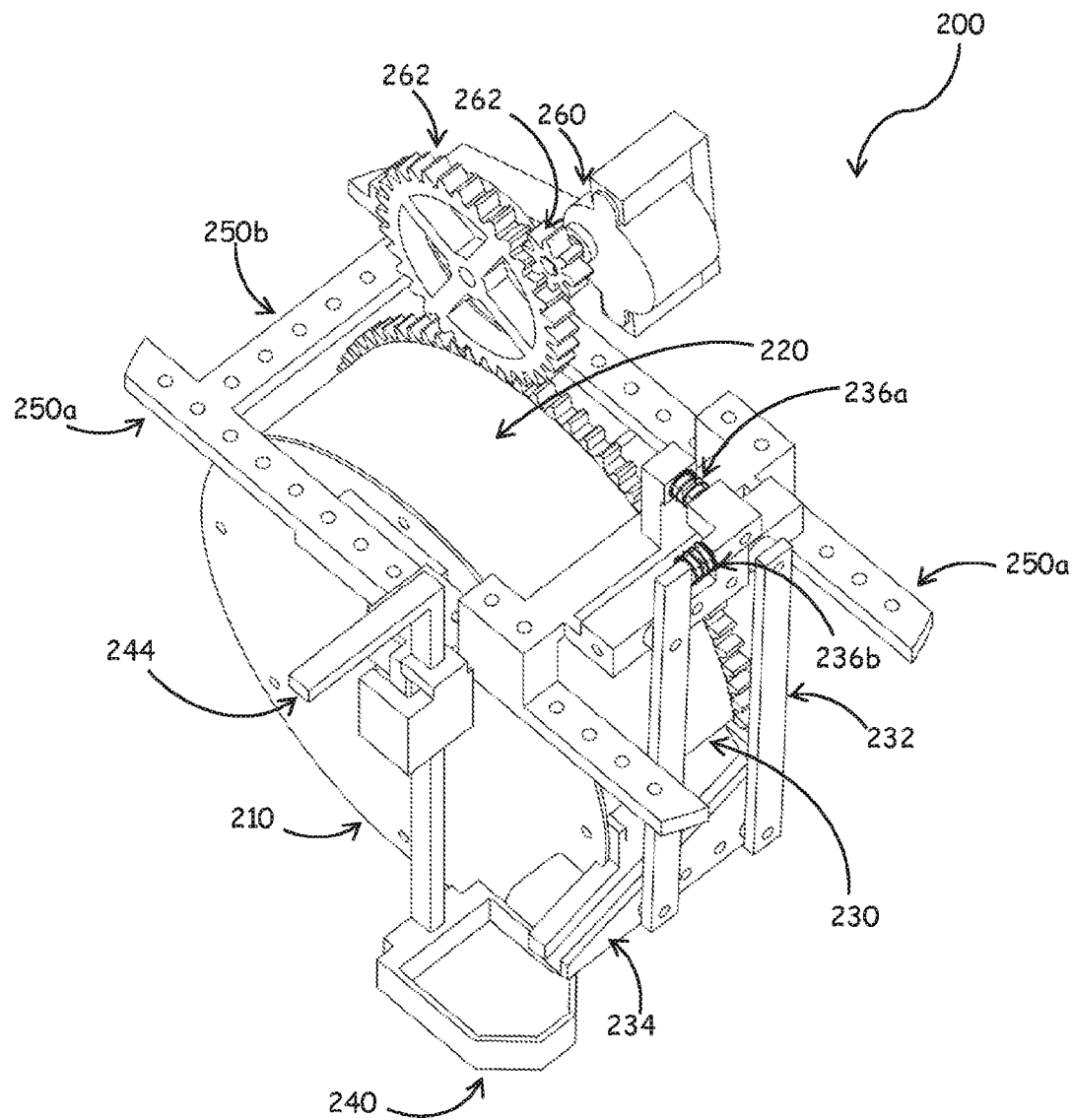
FIG. 2A is a perspective view of an exemplary vitrification system.
Figure 2B:
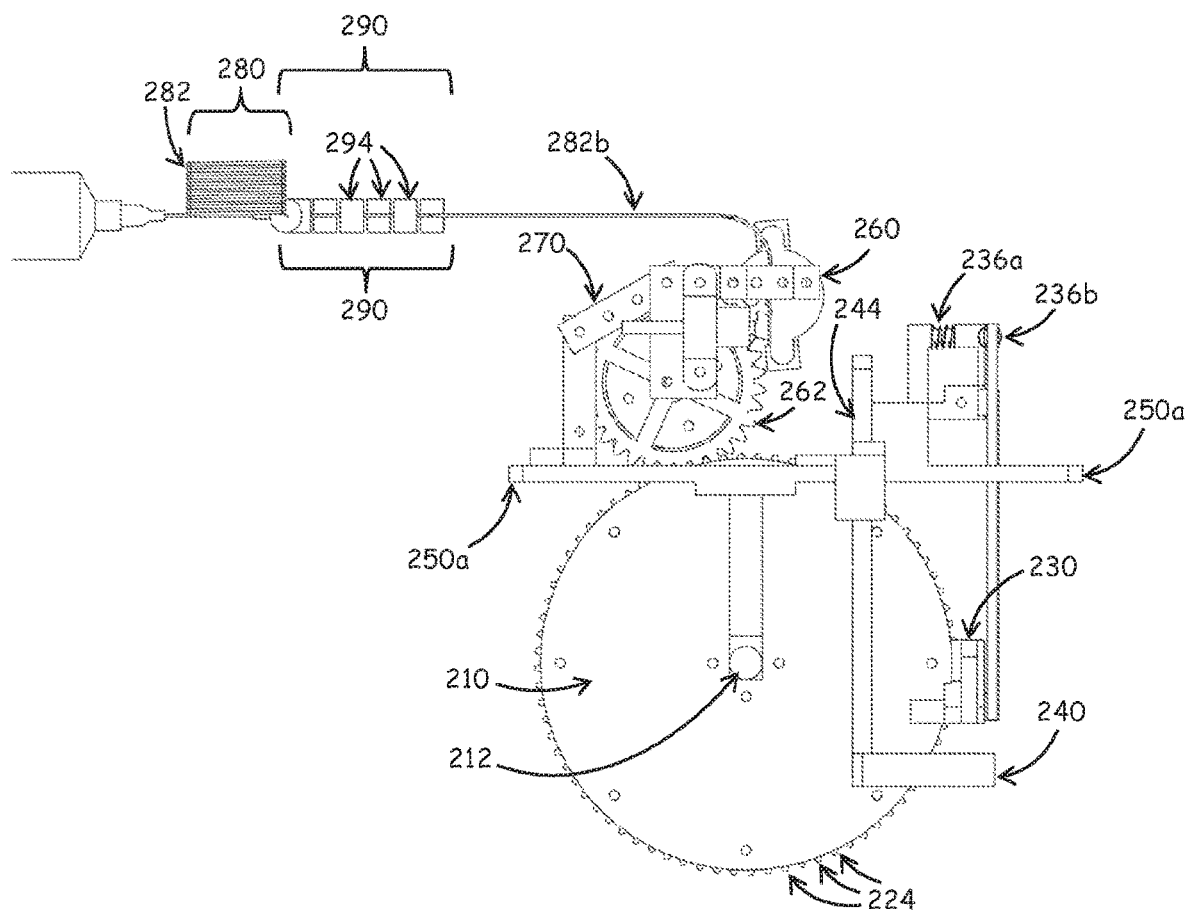
FIG. 2B is a side view of an exemplary vitrification system.
Figure 2C:
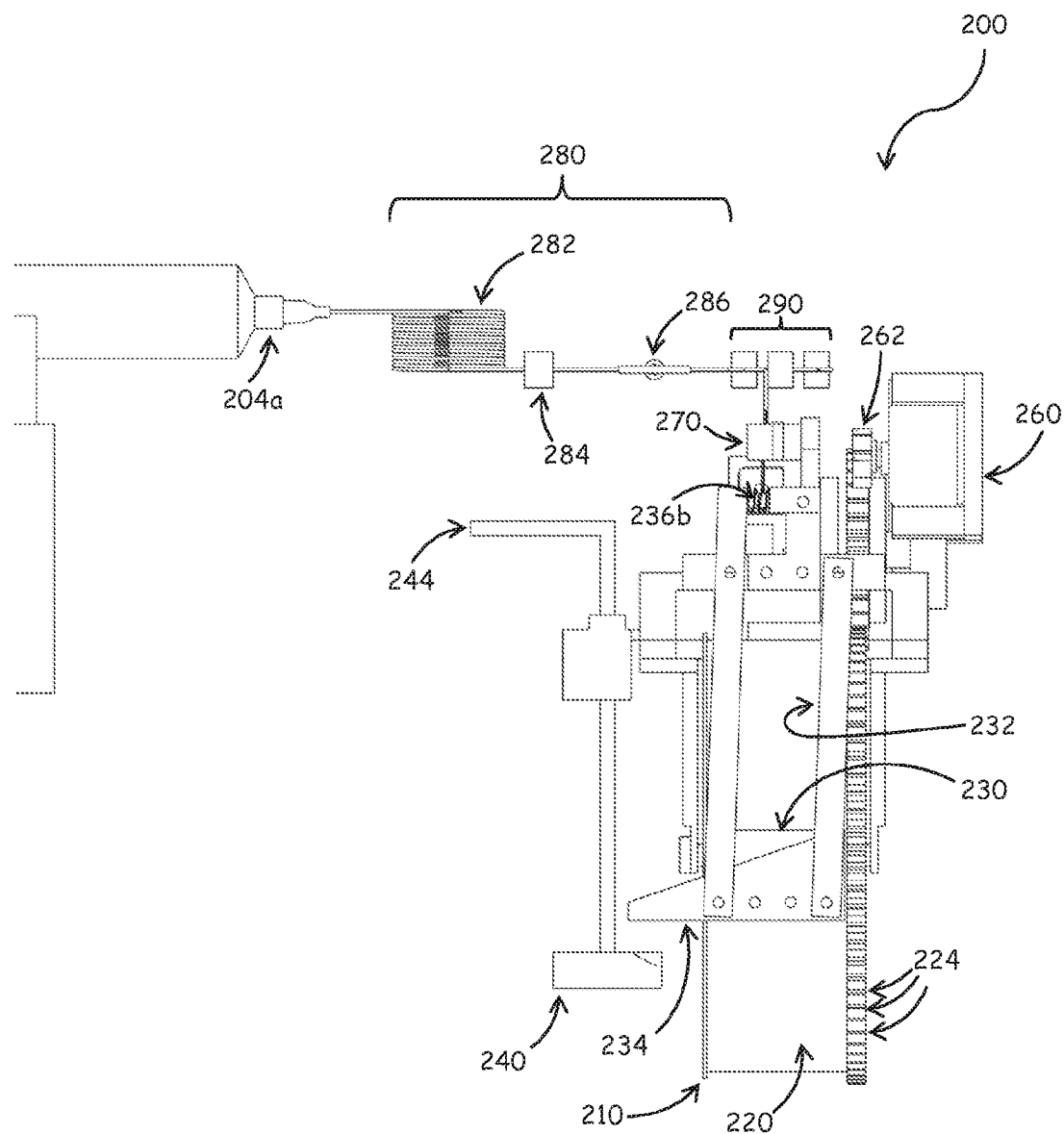
FIG. 2C is a front view of an exemplary vitrification system.
Figure 2D:
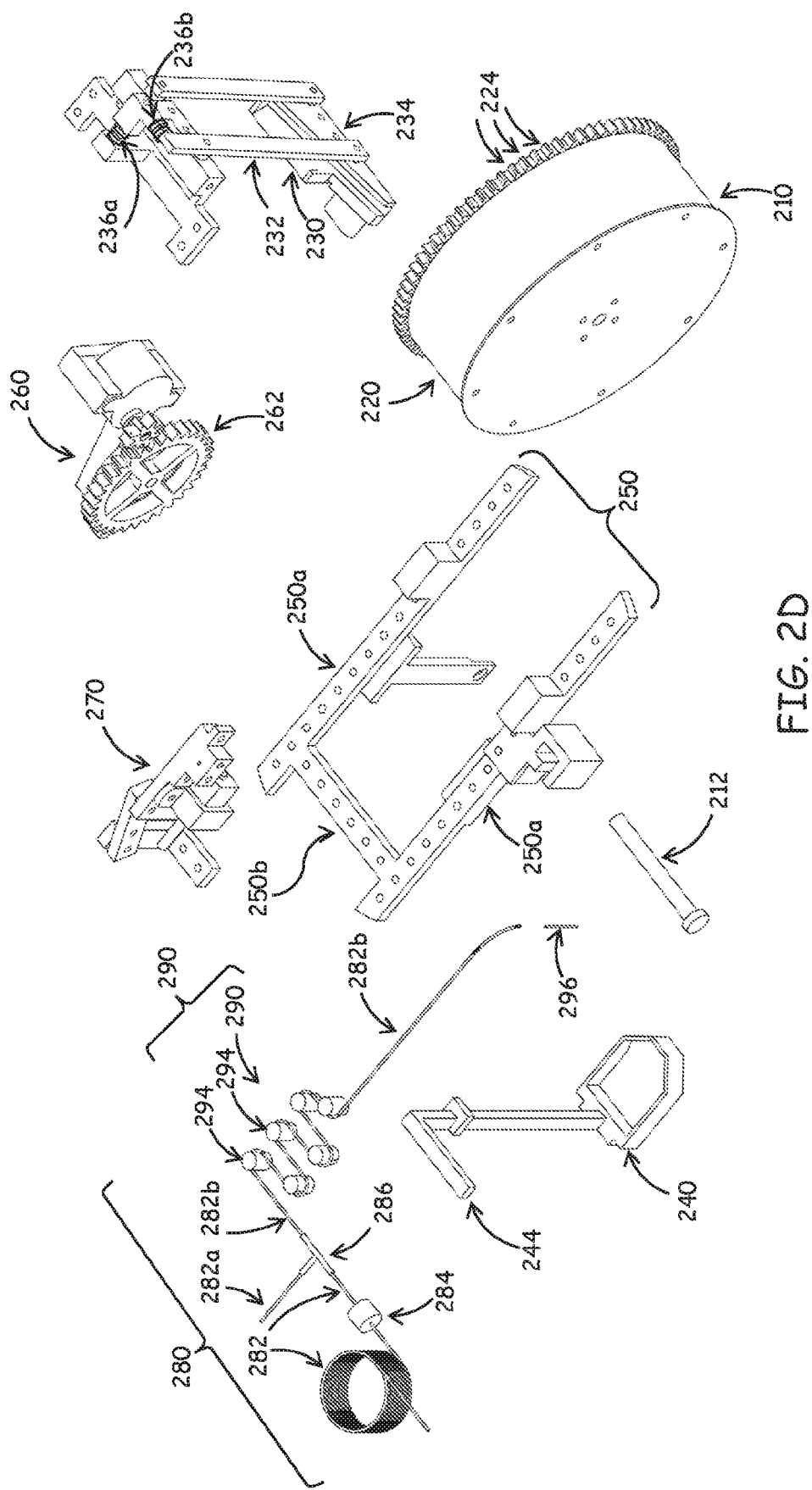
FIG. 2D is an exploded view of some of the components of the vitrification system of FIGS. 2A-2C, FIG. 2E and cryopreservation system of FIG. 2F.
Figure 2E:
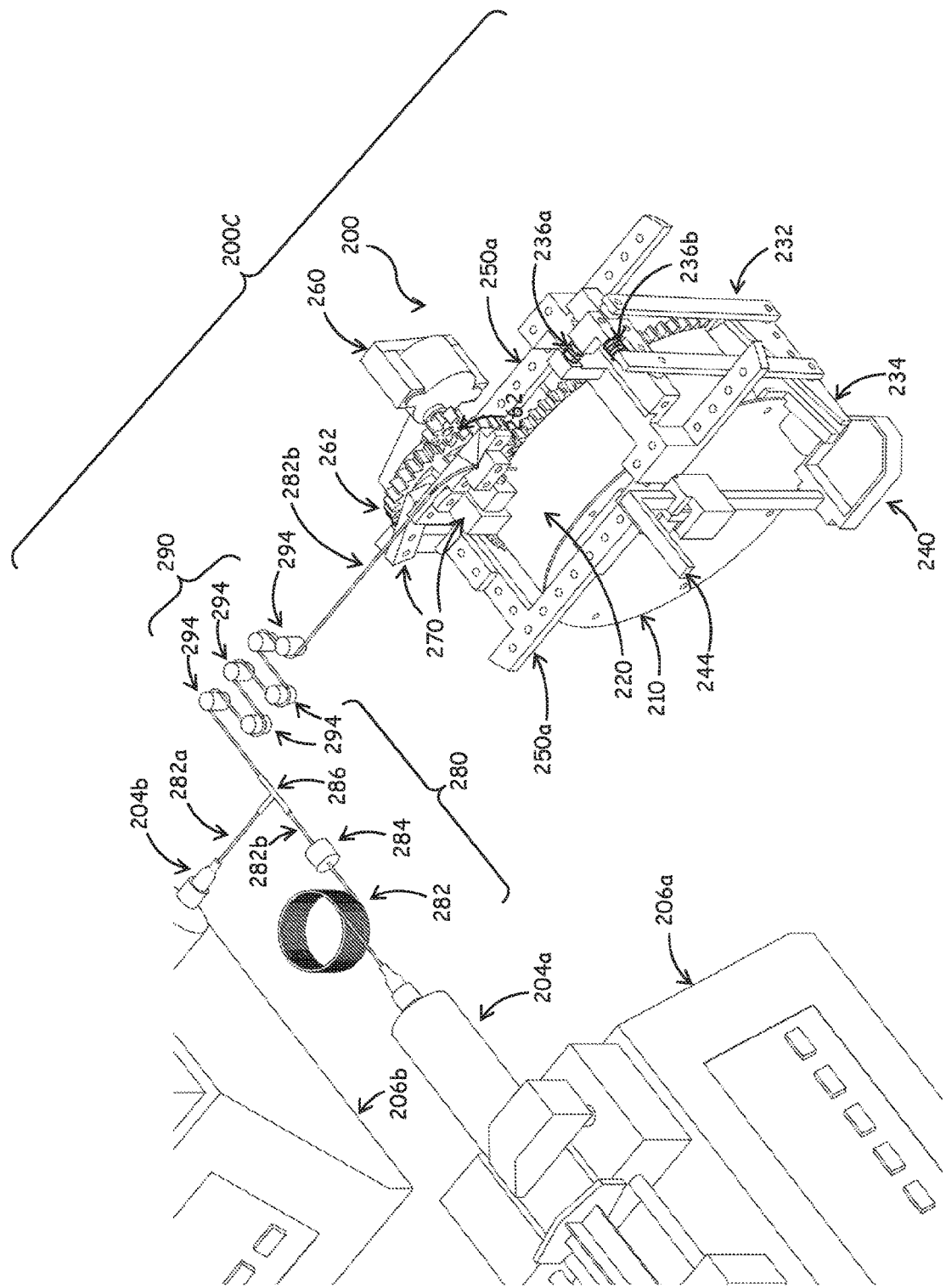
FIG. 2E is a perspective view of a vitrification system with the fluidics system.
Figure 2F:
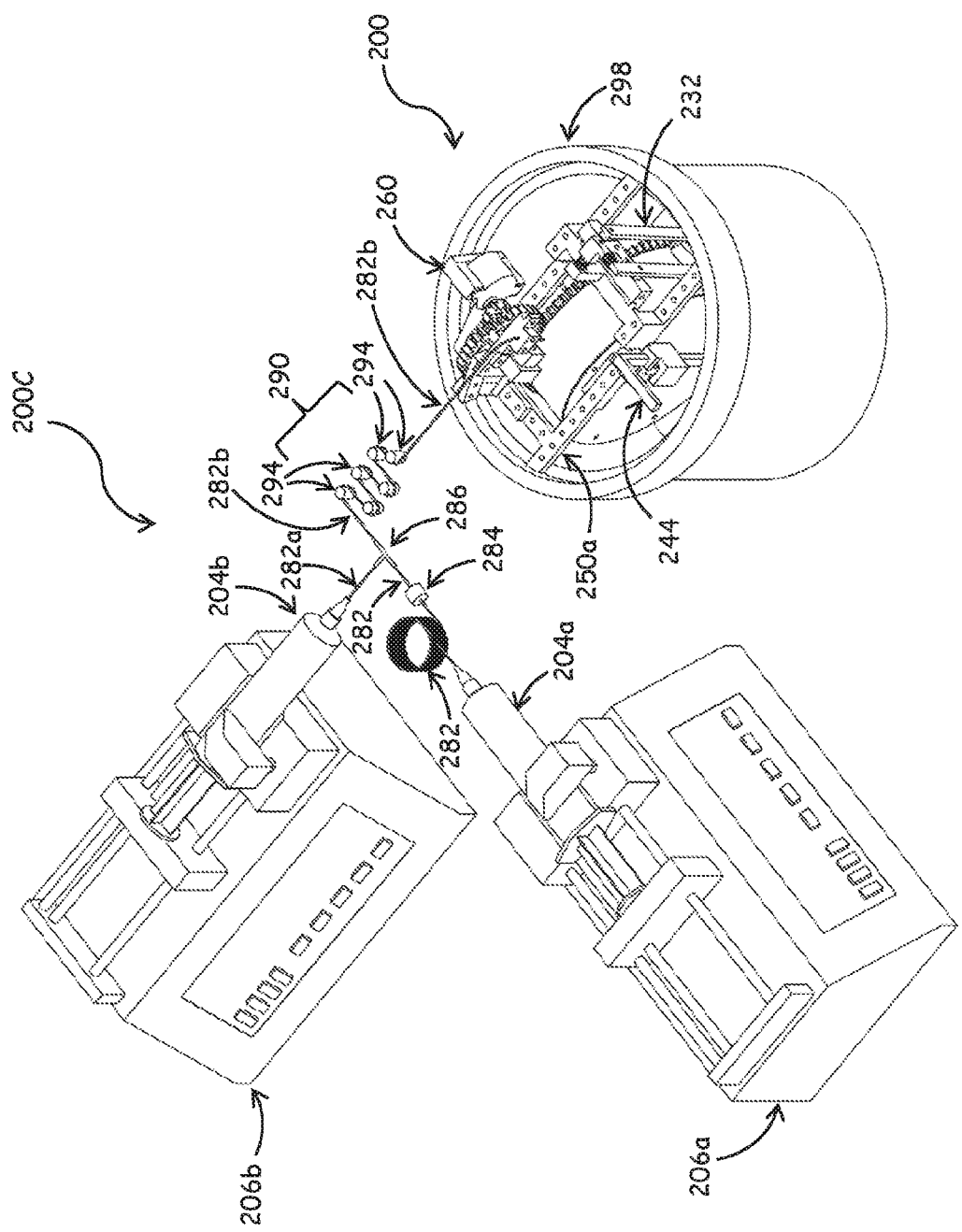
FIG. 2F is a perspective view of a cryopreservation system.

The present description includes a vitrification system and methods of vitrification of biological samples as described herein. FIGS. 2A-2D are drawings of one exemplary embodiment of a vitrification system. FIGS. 2E-2F also include vitrification system 200 connected to fluidic system 280, mixing system 290 and other components operably connected to form a cryopreservation system. As shown in FIGS. 2A-2D, vitrification system 200 can include cryowheel 210 with facing surface 220. Cryowheel 210 is rotatably mounted and rotates around axis pin 212. Cryowheel 210 is engaged by mounting assembly 250 (FIG. 2D). In one embodiment, cryowheel 210 may include gears 224 to engage and drive the rotation of cryowheel 210 by gears 262 of stepper motor 260. Vitrification system 200 is illustrated with stepper motor 260 but it will be understood that other apparatus may be used to drive the rotation of cryowheel 210. Other methods of driving the rotation of the cryowheel may also be used and are included in the scope of this description. System 200 can also include ramp assembly 232. Ramp assembly 232 can include scraper 230 to dislodge or detach biological samples from facing surface 220 onto ramp 234 after vitrification of samples. Ramp assembly 232 can support ramp 234 and press it firmly against cryowheel 210. Spring 236a can press ramp 234 against facing surface 220 of cryowheel 210. Spring 236b can align ramp 234 correctly along the axis parallel to the axis of rotation of cryowheel 210. System 200 can also include tray 240 to receive the dislodged vitrified samples from ramp 234. Tray 240 can be removable. Handle 244 can be used to lift tray 240, when desired.

Mounting assembly 250 can include parallel bars 250a. Cryowheel 210 can be mounted between parallel bars 250a. In some embodiments, a portion of cryowheel 210 and facing surface 220 can rise above parallel bars 250a during rotation of the cryowheel. When vitrification system 200 is housed in cryogenic container 298 with cryogenic coolant, the level of coolant can, for example, be at least to the level of parallel bars 250a leaving a portion of facing surface 220 transiently exposed above the level of the coolant for deposition of a biological sample. In some embodiments, the level of coolant may be below the level of parallel bars 250a. Facing surface 220 can be transiently above the level of the coolant and can return to soaking in the coolant prior to warming above cryogenic temperatures. Cryowheel 210 may be suspended in cryogenic container 298 using other methods and all are within the scope of the description.

System 200 may include fluidics system 280. Fluidics system 280 can include larval reservoir loop of tubing 282 and Luer connection 284 by which larval reservoir loop of tubing 282 may be detached from the rest of system 280 to charge it with larvae. Fluidics system 280 can include T-junction 286 where the contents of tubing 282 and contents of tubing 282a to be mixed can meet. Fluidics system 280 can include serpentine mixing section 290 and Nordson PTFE-coated syringe tip 296 (detached for clarity in FIG. 2D.) System 200 may also include droplet production head 270 with a linear solenoid.

A computer may be connected to system 200 to drive stepper motor 260 to engage cryowheel 210 and initiate rotation of cryowheel 210. Rotation of cryowheel 210 can be continuous to process a high-throughput of biological samples. As samples are deposited by droplet production head 270, the continuous rotation of cryowheel 210 can submerge the sample below the level of the cryogenic coolant, reducing the Leidenfrost effect on the sample and improving the ability to obtain vitrified samples. System 200 can also include syringe 204a and syringe 204b that may also be connected to I/O systems 206a and 206b, respectively.

Cryowheel 210 may be rotated at a variety of revolutions per minute (rpms). The rpms can be between about 0.5 rpms and about 60 rpms. In some embodiments of the system described herein, the rpms can be between about 3 rpms and about 12 rpms.

Vitrification system 200 can be a high-throughput system. The rate of droplet production can vary from about 30 to about 3600 droplets produced per minute. In some embodiments of the system described herein, the rate of droplet production can vary from about 60 to about 600 droplets produced per minute.

The components of vitrification system 200 can include a variety of cryoresistant materials. Cryoresistant materials can include polymers and/or metals. They can also include commercially available 3D printing materials including, but not limited to, polylactic acid (PLA), nylon, and acrylonitrile butadiene styrene (ABS). They can also include commercially available hardware components such as steel and nylon machine screws, washers, lockwashers, nuts, and locknuts.

Facing surface 220 can include materials that are cryoresistant and porous. The porosity of the materials of facing surface 220 can be sufficient for a droplet released onto the surface to lightly adhere to the surface when above the level of the cryogenic coolant. In one embodiment, the temperature of the portion of facing surface 220 above the coolant level can be maintained at about the cryogenic temperature for the duration of the period that the portion is above the coolant level. In other words, cryowheel 210 is rotating at a speed that is sufficient to have droplets deposited on the portion of facing surface 220 above the coolant level and is then rotated at sufficient speed to submerge the droplet below the coolant level before the coolant boils off facing surface 220. Facing surface 220 can maintain the integrity of the droplets and can cool the droplets sufficiently that the liquid in the droplets may not soak into the surface but remain as distinct units.

Material(s) that can be used for facing surface 220 may be referred to herein as the facing material. The facing material for the cryowheel can have appropriate porosity to soak up and retain liquid nitrogen in the liquid phase briefly following the facing material's emergence from the liquid nitrogen surface, which emergence is due to the continuous rotation of the cryowheel. The facing material also has a sufficiently rough surface to allow droplets to lightly adhere to it. As long as liquid nitrogen is present in the liquid phase in the matrix of the facing material, the facing material can maintain a temperature of approximately −196° C., the boiling temperature of liquid nitrogen under 1 atmosphere of pressure. Once the nitrogen has boiled off, the facing material can quickly warm to a temperature that no longer promotes the vitrification of droplets, and that absorbs the droplets into the facing material rather than retaining them lightly adhered as discrete spherical or near-spherical droplets. In one exemplary embodiment, balsa wood is used as the material for the facing surface.

The facing surface of a cryowheel can include a variety of materials. These materials include, for example, polystyrene foam or ethylene vinyl acetate foam. In one embodiment, the facing surface can include commercially available balsa wood sheet of thickness of about 1 mm from the species *Ochroma pyramidale* (HouseMart Ben Franklin Crafts) adhered to the face of the cryowheel with Professional Welder contact adhesive (Homax Products, Inc.) Other woods, balsa woods, and porous materials may also be used and all are within the scope of this description.

The facing surface can be materials that are generally cryoresistant, i.e. maintain integrity at cryogenic temperatures, in order to receive a biological sample. The thickness of the facing surface can vary. The thickness and the material of the facing surface is such that the facing surface receiving the sample can be maintained at a cryogenic temperature. The facing surface may have a thickness of at least about 0.1 mm. In some embodiments, the thickness of the facing surface is between about 0.1 mm and about 2 mm. Thickness outside of this range is also within the scope of this disclosure.

Figure 3A:
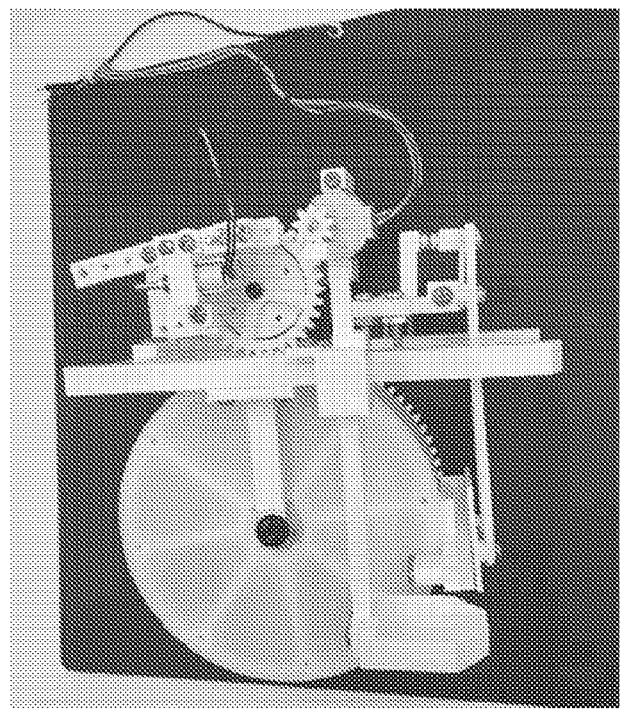
FIG. 3A is a photograph of a side view of a vitrification system.
Figure 3B:
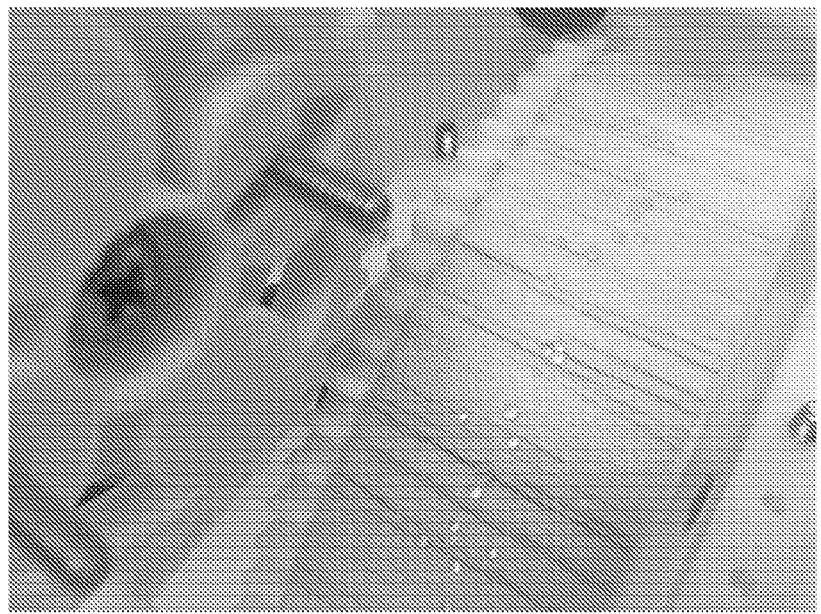
FIG. 3B is a photograph of the balsa wood facing surface of a cryowheel of the vitrification system in FIG. 3A with droplets of a biological sample in a cryoprotectant composition.

FIG. 3A and FIG. 3B are photographs of one exemplary embodiment of a vitrification system described herein. FIG. 3A is a photograph of a side view of a vitrification system removed from its liquid nitrogen bath and showing the overall structure. The stepper motor at upper right can drive the rotation of the cryowheel. FIG. 3B is a photograph of the balsa wood facing surface of a cryowheel of the vitrification system of FIG. 3A with droplets of a biological sample. The facing surface will be discussed herein with reference to balsa wood but it will be understood that other materials may be used and are also within the scope of this description. As shown in FIG. 3B, the droplets can be released onto a wheel faced with balsa wood. The facing surface of the wheel can serve as a surface to which the biological samples mildly adhere. The balsa wood of the facing surface can also serve as a carrier of liquid nitrogen. The balsa wood can be continuously soaked in the cryogenic coolant by the rotation of the wheel that can be substantially submerged in a cryogenic coolant. Direct contact of the sample droplets with the balsa wood can begin the vitrification process. Continuous rotation of the wheel can pull the sample droplets below the surface of the liquid nitrogen, greatly increasing the rate at which the droplets are cooled, thereby promoting vitrification rather than crystalline nucleated growth of the cryoprotectant solution (i.e. ice formation.)

Many variations in the size and configuration of the cryowheel and the vitrification systems are possible and all are within the scope of this description.

Biological samples can be vitrified in a variety of cryogenic environments. In one embodiment, cryogenic coolant can include, for example, liquid nitrogen. Other cryogenic coolants such as ethanol, methanol, or FC 770 oil (3M) may also be used and all are within the scope of this description.

A variety of biological samples can be vitrified for cryopreservation according to the systems and methods described herein. Biological samples can include human cells (e.g., pancreatic islet cells, stem cells, biopsy samples, etc.), mouse oocytes, zebrafish embryos, *Xenopus laevis* oocytes, coral larvae, or *Lepidochelys olivacea* embryos. In some embodiments, the sample can include germplasm, e.g., from a biopsy taken from a testis or an ovary from any animal or species. In other embodiments, however, any tissue sample that can be loaded with a cryoprotective agent and laser absorber, whether metallic or otherwise, can be used in connection with the systems described herein. Exemplary alternative samples include, for example, neural cells, ganglia, stem cell spheroids, and any biopsy from any soft tissue within the size parameters listed in the immediately following paragraph. If the diameter of the laser beam can be broadened, additional exemplary samples include, for example, the cornea, skin, or other thin tissues. While described herein in the context of an exemplary embodiment in which the biological sample is a coral larva, the systems and methods described herein can be applied to a variety of materials.

The biological material can be any millimeter-sized biomaterial. In some embodiments, the term millimeter-sized sample can have a smallest linear dimension of less than about 5 mm. In one embodiment, the sample can be less than about 4 mm. In one embodiment, the sample can be less than about 3 mm. In one embodiment, the sample can be less than about 1 mm. In one embodiment, the sample can be less than about 0.5 mm. In one embodiment, the sample can be less than about 0.1 mm.

In some embodiments, the biological sample can be between about 0.01 mm and about 2.0 mm.

The biological material can be any microliter-sized biomaterial droplet. In some embodiments, the microliter-sized sample can have a volume of less than 5.0 µl. In one embodiment, the microliter-sized sample can have a volume of less than 1.5 µl. In one embodiment, the microliter-sized sample can have a volume of less than 1 µl. In one embodiment, the microliter-sized sample can have a volume of less than 0.5 µl. In one embodiment, the microliter-sized sample can have a volume of less than 0.1 µl.

In some embodiments, the microliter-sized sample can have a volume of between 0.1 µl and about 5.0 µl.

In one embodiment, coral larvae, depending on species, can be between about 100 µm and 1000 µm in diameter and can be vitrified as described herein. In another embodiment, coral symbiotic algae that are about 10 µm in diameter may also be vitrified as described herein. The vitrification system can vitrify droplets containing larvae or younger, pre-larval embryos from a wide range of coral species, enabling large-scale bio banking to avoid species extinction.

Consistent sized droplets may be compatible with laser warming. Droplets that are too large may de-vitrify (i.e. turn to crystalline ice before melting) in part or entirely on warming due to their excessive thermal mass and excessive attenuation of incident laser light, while droplets that are too small may be vaporized by the laser. Droplets that are too large and that are too small may be lethal to the sample. Droplets that are too small relative to the size of the biological sample contained within them may not contain sufficient laser-absorbing material to warm completely or quickly enough when struck by light from a laser. Droplets that are of consistent size may melt in a consistent, repeatable manner when struck by light from a laser operated repeatedly at consistent voltage, pulse length, pulse shape, and beam diameter, with the droplets placed in a consistent position relative to the beam.

The systems and methods described herein can be useful for biological material that is sensitive to exposure to cryoprotectants and may need short equilibration times, such as coral larvae (which are highly sensitive to the length of time spent in cryoprotectant.) Prolonged exposure to a liquid cryoprotectant composition can be lethal to coral larvae, for example, due to long chemical exposure. Conversely, an exposure time that is too short can be equally lethal to coral larvae, for example, due to insufficient osmotic extraction of water before vitrification, which leads to the development of a crystalline phase inside the larvae. The optimal length of exposure time can be empirically derived and may be required to be carefully controlled during the operation of the systems and methods described herein.

The droplets of a pre-vitrification composition can include biological samples and can also include agents to promote cryopreservation and/or warming to revive the cryopreserved samples. These agents can include, for example, cryoprotective agents and/or laser absorbers. Other agents that aid in the cryopreservation, sorting or warming processes may also be included in the biological sample.

While described herein in the context of an exemplary embodiment in which the cryoprotective agent includes propylene glycol and DMSO, the composition, systems and methods described herein can involve the use of any suitable cryoprotective agent. Exemplary suitable cryoprotective agents include, but are not limited to, combinations of alcohols, sugars, polymers, and ice blocking molecules that alter the phase diagram of water and allow a glass to be formed more easily (and/or at higher temperatures) while also reducing the likelihood of ice nucleation and growth during cooling or thawing. In some embodiments, cryoprotective agents are not used alone, but in cocktails. In the case of vitrification solutions, exemplary cryoprotective cocktails are reviewed in Fahy et al., He, Xiaoming, et al., Risco, Ramon, et al. and Choi, Jung Kyu, et al. and all are incorporated herein by reference. (Fahy et al., "Improved vitrification solutions based on the predictability of vitrification solution toxicity." *Cryobiology* 48(1) (2004): 22-35; He, Xiaoming, et al., "Vitrification by ultra-fast cooling at a low concentration of cryoprotectants in a quartz microcapillary: a study using murine embryonic stem cells." *Cryobiology* 56(3) (2008): 223-232; Risco, Ramon, et al., "Thermal performance of quartz capillaries for vitrification." *Cryobiology* 55(3) (2007): 222-229; Choi, Jung Kyu, Haishui Huang, and Xiaoming He, "Improved low-CPA vitrification of mouse oocytes using quartz microcapillary." *Cryobiology* 70(3) (2015): 269-272.) Additional exemplary cryopreservative solutions can include one or more of the following: dimethyl sulfoxide, glycerol, propylene glycol, ethylene glycol, sucrose, trehalose, raffinose, polyvinylpyrrolidone, and/or other polymers (e.g., ice blockers and/or anti-freeze proteins).

In some embodiments, the cryoprotective agent may be present in the composition at various concentrations. In some embodiments, the cryoprotective agent may be present, for example, at a molarity of no more than 6 M, for example, no more than 5 M, for example, no more than 4 M, for example, no more than 3 M, for example, no more than 2 M, for example, no more than 1 M, for example, no more than 900 mM, for example, no more than 800 mM, for example, no more than 700 mM, for example, no more than 600 mM, for example, no more than 500 mM, or for example, no more than 250 mM.

In one embodiment, a composition including a cryoprotective agent and a laser absorber may be microinjected into the biological sample. The cryoprotective agent and/or the laser absorber may be in a medium that is conducive to maintaining the integrity of the biological sample. The medium, for example, can be a buffered medium or solution.

While described herein in the context of an exemplary embodiment in which the laser absorber is gold nanorods, the technology described herein can involve the use of a laser absorber of any suitable geometry and containing any suitable laser absorbing plasmonic material. Generally, the laser absorbing plasmonic material absorbs a narrow band of laser energy in contrast to, for example, India Ink, which is a broad band absorber. Thus, in some embodiments, the laser absorber can include material effective at converting laser energy into heat such as, for example, a metal such as gold, silver, titanium, and/or copper. In other embodiments, the laser absorber can be an alternative plasmonic material such as, for example, graphene. In some embodiments, the laser absorber can include an additional material such as, for example, a silicon core. Thus, the laser absorber can include a plurality of materials generally constructed to include a core and a shell that at least partially covers the core. The particular material or combination of materials used in the laser absorber can be selected based, at least in part, on the particular wavelength of the laser being used to warm the sample. For example, when using a diode laser with a wavelength of 800 nm, the laser absorber can include a gold nanoshell with a silicon core. Similarly, the laser absorber can have any suitable geometry including, for example, a rod shape, a sphere, a cube, a horn, a star, etc. Selection of materials and geometry of the laser absorber can allow broad band absorption of various laser wavelengths from, for example, 200 nm to 2000 nm. Thus, the laser can also be selected to excite at any wavelength suitable to match the absorption of the plasmonically active nanoparticle.

The present description also includes methods for vitrifying samples using the vitrification systems described herein. The method can include releasing droplets of a biological sample bathed in a cryoprotectant composition referred to herein as a pre-vitrification composition onto the facing surface of the cryowheel. The droplets can be generated and dropped onto the facing surface using a variety of devices. In one embodiment, a percussion based droplet production head may be used as described in greater detail below. Other methods of generating droplets may be used and are within the scope of this description. In some embodiments, droplets generated can be of a consistent size.

The droplets of the pre-vitrification composition can be deposited at varying rates. Droplets can be released onto the facing surface at a rapid rate. In some embodiments, droplets are released onto the facing surface at a rate of about 30 to about 3600 droplets per minute. In some embodiments, the droplets are released onto the facing surface at a rate of about 60 to about 600 droplets per minute.

The droplets can be released onto the facing surface of a rotating cryowheel of a vitrification system. The facing surface can be porous and lightly adhere the released droplets. When the droplets land on the facing surface, the integrity of droplets can be maintained. In other words, the liquid of the droplets is not absorbed by the facing surface but the facing surface is sufficiently cold to maintain the integrity of the droplets.

The cryowheel can be continuously rotating at a set desired speed and substantially submerged in a cryogenic coolant. By substantially submerged, it is meant that greater than about 50 percent of the diameter of the cryowheel is below the coolant, or greater than about 75 percent, or greater than about 90 percent, or greater than about 95 percent of the cryowheel is below the cryogenic coolant level in a cryogenic container.

The droplets from a dispensing system can be dispensed onto a portion of the facing surface that is above the level of the cryogenic coolant. The facing surface can receive the droplets such that the droplets are not stacked on top of each other or in contact with another droplet. The droplets can adhere slightly to a facing surface such as balsa wood. The droplets can be pulled under the surface of the cryogenic coolant by continuous rotation of the cryowheel. In one embodiment, the droplets can be submerged into the cryogenic coolant by the rotation of the cryowheel to form a vitrified biological sample. The use of a continuously rotating wheel substantially immersed in a cryogenic coolant can rapidly cool and vitrify marginally vitrifiable droplets of a pre-vitrification composition in a manner compatible with high-throughput production. The cryowheel can be rotated at a speed that can enable maintenance of the cryogenic temperature of the facing surface when the cryowheel is above the level of the coolant.

By rapidly cooling, it is meant that the droplets can be pulled below the surface of the coolant within about less than about 5 seconds after contact with the facing surface. In some embodiments, the droplets can be pulled below the surface of the coolant in less than about 2 seconds. In some embodiments, the length of time between the adhesion of the droplet to the facing surface of the cryowheel and the submersion of the droplet in cryogenic coolant is minimized to the least time practically possible. The cooling rates of the samples in the cryogenic environment can vary and are sufficient to achieve vitrification. In one embodiment, the cooling rate achieves at least the CCR for the sample. The cooling rates can be at least about 1,000° C./min. In some embodiments, the cooling rates can be between about 1,000° C./min and about 10,000° C./min. In some embodiments, the cooling rates can be about 10,000° C./min or faster. The necessary CCR (i.e. the minimum cooling rate to produce successful, complete or nearly complete vitrification) can depend in part on the concentration of cryoprotective agents included in the droplet, and can also depend in part on the volume of the droplet. The attainable cooling rate can depend in part on the speed with which the droplet may be submerged in cryogenic coolant following adhesion to the facing surface.

Rapid cooling of the droplets can result in greater than about 50 percent of the droplets becoming vitrified, greater than about 75 percent, or greater than about 90 percent, or greater than about 95 percent of the droplets becoming vitrified droplets.

The cryoprotectant may be at relatively low osmolality to reduce toxicity to the larvae. However, if the osmolality of the cryoprotectant is too low, it can reduce the ability of the solution to vitrify. Achieving a balance between a high enough osmolality to vitrify and a low enough osmolality to allow survival can be difficult. Advantageously, the vitrification systems described herein can be used to increase the rate at which the droplets cool enabling vitrification of samples even with low concentration of cryoprotectants.

Without being bound by any theory, it is believed that if the droplets are dropped directly onto the surface of the cryogenic coolant such as liquid nitrogen, they cool at a rate strongly limited by the Leidenfrost effect, which prevents direct contact with the liquid nitrogen. This effect can also prevent the droplets from sinking into the liquid nitrogen until they cool to the same temperature as the liquid nitrogen: during cooling, the droplets bounce about on the surface of the liquid nitrogen, and are not surrounded by liquid nitrogen. The cryowheel with the facing surface described herein can prevent stacking of droplets upon one another through continuous automated movement. Through continuous automated movement, the facing surface, for example, balsa wood, is soaked in cryogenic coolant so that the dispensed droplets come into contact with the coolant-soaked facing surface and the droplets can remain adhered to the facing surface once the droplets are immersed under the surface of the cryogenic coolant. This can greatly reduce the insulating effect and increase the cooling rate and can thereby reduce the Leidenfrost effect by completely surrounding the droplets with cryogenic coolant.

After the droplets are submerged and vitrified, the droplets can be later detached from the facing surface. The submerged droplets can be detached from the facing surface by a scraper that can gently brush the droplets off the cryowheel as it rotates. In one embodiment, the vitrified samples can sink freely to the bottom of the bath of cryogenic coolant for later collection. The scraper can also be submerged in the cryogenic coolant. In one embodiment, the dislodged samples can roll onto a ramp and be collected in a tray as shown in FIGS. 2A-2C.

Figure 8:
FIG. 8 is a photograph of droplets demonstrating the importance of rapid cooling. The droplets on the left have cooled too slowly, and so crystalline ice has formed inside them. The droplet on the far right has vitrified cleanly.

FIG. 7 and FIG. 8 are photographs and indicate the importance of rapid cooling. The droplets on the left in FIG. 8 have cooled too slowly, and so crystalline ice can be seen to have formed inside the droplets. The droplet on the far right has vitrified cleanly, and larvae inside it would likely survive the cryopreservation process.

The vitrification methods described herein can be applicable to any situation in which it is necessary to vitrify solutions containing biological material in a high-throughput manner with consistent droplet sizes, especially where the goal is to bank and laser-warm the droplets at a later time. Applications can include conservation (e.g. cryobanking of threatened species' germplasm and related materials for future restoration work) and medical uses (e.g. cryobanking of human cells that are otherwise difficult to cryopreserve and that may, like coral larvae, require laser warming to survive the warming process.)

The biological sample treated as described herein can be bathed in a medium that is amenable to maintaining the integrity of the biological sample. Maintaining the integrity of the biological sample as used herein relates to preventing cellular membrane disruption and release of cellular contents due to loss of integrity of the membrane structure. Other forms of disruption of the biological sample that hinders recovery of the biological activity, e.g. crystallization of sample, upon warming after cryopreservation should also be avoided. Other methods of preparing a biological sample may be used and are within the scope of this description.

Vitrification of a biological sample can include cooling of a biological sample for cryopreservation with minimal or no crystallization of the biological sample during the cooling of the biological sample. It is also desired that minimal or no crystallization occurs during the warming of the cryopreserved sample. Crystallization either during the cooling and/or the warming phase can decrease or eliminate the viability of the biological sample. Better vitrification can be achieved by an increased concentration of cryoprotectant chemicals, which are toxic in themselves, by an improved ratio of said chemicals, by substitution of said chemicals with other, more effective chemicals, or by increasing the rate of cooling. Quality of vitrification can be assessed by eye or other techniques known in the art. Crystalline ice appears white and opaque, while the vitrified glassy state appears transparent. Partial vitrification can be associated with poor survival and can be visible as a cloudy, partially transparent state that results from small nuclei of ice growing throughout the sample.

The vitrification systems described herein may be used in conjunction with a variety of cryopreservation devices. Exemplary cryopreservation devices are described herein and also include cryopreservation systems, for example, described in U.S. Patent Application Ser. No. 62/702,037 to Li Zhan et al. and incorporated herein by reference.

The present description also includes cryopreservation devices for cryopreservation of biological samples. The cryopreservation device can be a high throughput system for processing large numbers of samples. The cryopreservation device can include a system for transferring biological specimens and other components into the cryopreservation device, a mixing system for mixing the biological sample with cryoprotectant compositions, a droplet generating system for generating droplets of the pre-vitrification composition that include biological materials and a vitrification system for vitrifying the droplets containing the biological samples. The cryopreservation devices described herein can produce standalone, spherical droplets in a rapid, serial high-throughput manner. In one exemplary embodiment, many thousands of larvae can be banked using the systems and methods described herein. The cryopreserved larvae in droplets can be warmed later, for example, with a Nd:YAG welding laser pulse in order to recover the larvae alive.

FIG. 2F is a schematic diagram of one embodiment of a cryopreservation system 200C including vitrification system 200, fluidics system 280, and mixing system 290 as described above. Vitrification system 200 is housed in cryogenic container 298.

Figure 4:
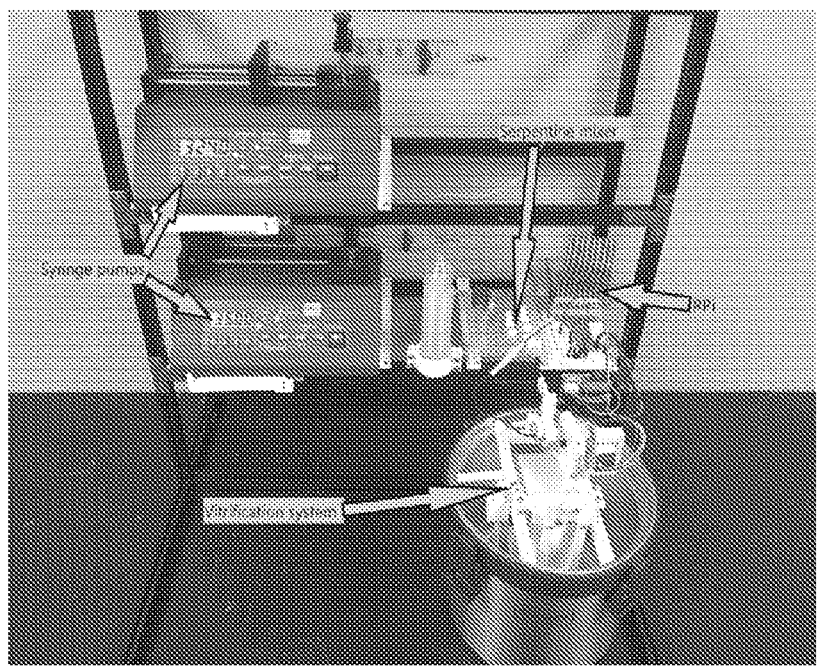
FIG. 4 is a photograph of a cryopreservation system with high-throughput vitrification system.
Figure 5:
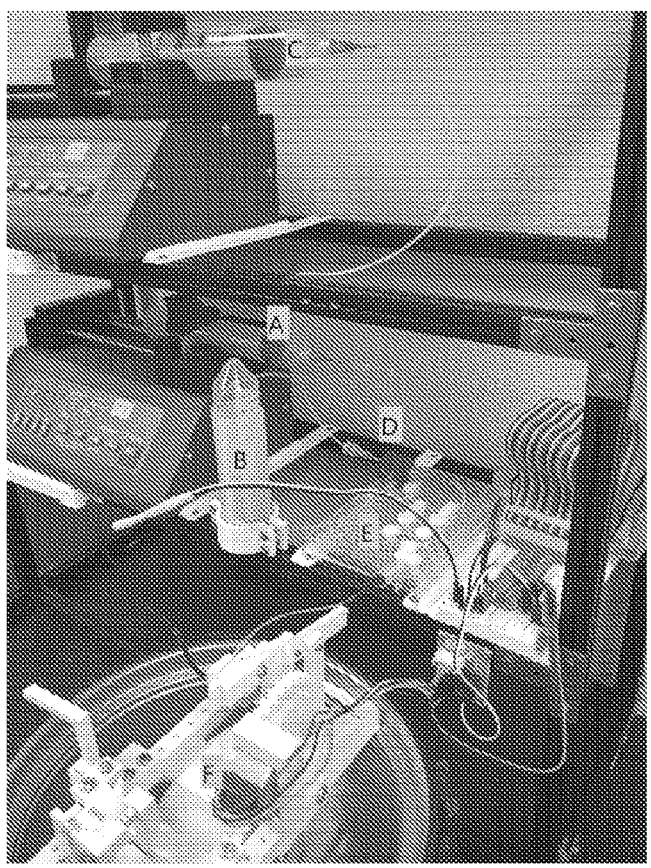
FIG. 5 is a more detailed photograph of the cryopreservation system shown in FIG. 3.
Figure 6:
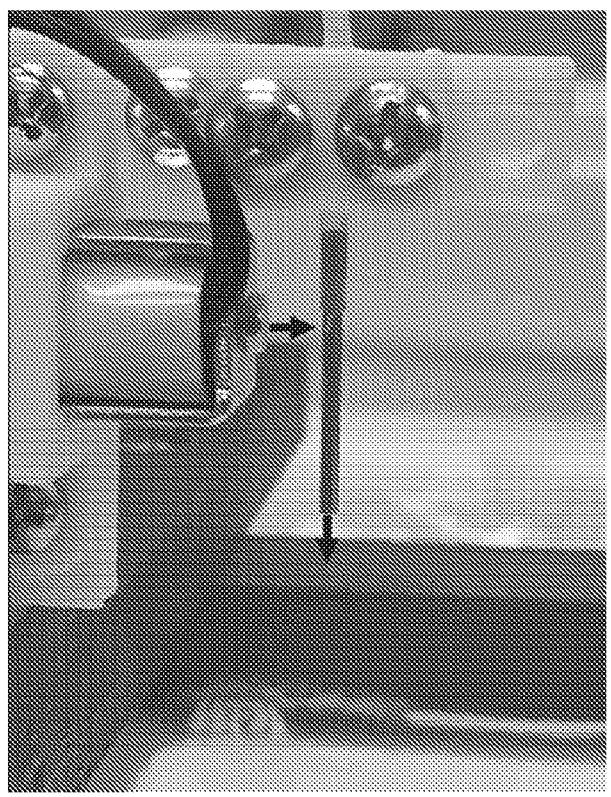
FIG. 6 is a more detailed photograph of the cryopreservation system shown in FIG. 3.

FIGS. 4-6 are photographs of one embodiment of a high-throughput cryopreservation system with a high throughput vitrification system. It will be understood that the system is described with reference to coral larvae and seawater but other biomaterials and fluids may be used and are within the scope of this description. Briefly, as shown in FIG. 4, the cryopreservation system can include two syringe pumps. One syringe pump can serve to produce a flow of the biological specimens, i.e. larvae. The other syringe pump can serve to produce a flow of a cryoprotectant composition that can include laser absorbers, e.g. gold nanorods. The mixing system can include a serpentine mixer. The serpentine mixer can include tubing arranged in a back-and-forth winding (serpentine) configuration that can promote mixing of the two compositions from the two syringe pumps to form a pre-vitrification composition. Consistently-sized droplets of the pre-vitrification composition can be generated by a droplet production head. These droplets can be dispensed into a vitrification system to vitrify the droplets in a cryogenic coolant such as liquid nitrogen. The cryogenic coolant can be in a cryogenic container that is shown as housing the vitrification system in FIG. 4. The system can include apparatus for driving the function of the cryopreservation system. The system also can include, for example, a computing system with input and output connected to a power supply. The computing system can be, for example, a Raspberry Pi (RPi) computer that controls the electromechanical components.

In FIG. 5, a more detailed photograph of the cryopreservation system of FIG. 4 is shown. In FIG. 5, syringe pump at (A) can push filtered seawater at a fixed rate into the tubing at (B). Coral larvae have previously been drawn into tubing at (B) and so can be gradually produced from this tubing by the action of the pump at (A). The tubing at (B) can be used to hold larvae, rather than a larger-volume reservoir being used, so as to keep the larvae evenly spaced as they enter the serpentine mixer. The syringe pump at (C) can push the prepared cryoprotectant composition containing laser absorbers. The fluids flowing from (B) and (C) can meet at (D), a T-junction that has been drilled out from a piece of hard plastic. The two fluids can travel together in tubing to the mixer at (E).

As seen in FIG. 2F, syringe pump 204a can push filtered seawater at a fixed rate into tubing 282. Coral larvae have previously been drawn into tubing 282 and so can be gradually produced from tubing 282 by the action of the pump 204a. Tubing 282 can be used to hold larvae, rather than a larger-volume reservoir being used, so as to keep the larvae evenly spaced as they enter serpentine mixer 290. Syringe pump 204b can push a prepared cryoprotectant composition containing laser absorbers. The fluids flowing from tubing 282 and 282a can meet at T-junction 286. T-junction 286 may be drilled out from a piece of hard plastic. The two fluids can travel together in tubing 282b to the mixer 290.

In one embodiment, mixer 290 is a serpentine mixer. Serpentine mixer 290 can include multiple posts 294 that determine the path of tubing 282b. The length of tubing 282b can wind back and forth between posts 294 to promote thorough mixing of the two fluids from tubing 282 and 282a. In some embodiments, serpentine mixer 290 can be necessary to promote mixing of the fluids because the fluids may not readily mix in straight lengths of tubing. A serpentine tubing path may be used to introduce eddy currents and differential flow velocities in the fluids to be mixed, disturbing laminar flow characteristics of the interface between the two fluids that may suppress mixing. Other methods of mixing small volumes of fluids may also be used and are within the scope of this description. The mixed fluid or pre-vitrification composition can continue to droplet production head 270 to be produced as a series of droplets. In one embodiment, the travel time of a larva or biological specimen from T-junction 286 to droplet production head 270 can be, for example, at least about 10 seconds. In some embodiments, the travel time can be between about 10 seconds and about 5 minutes. In one embodiment, the travel time can be about one minute. Travel times greater than 5 minutes and less than 10 seconds are also within the scope of this description. In some embodiments, the biological samples can be sensitive to the duration of the exposure time to a cryoprotectant composition. Increases in exposure time to cryoprotectant can lead to a decrease in the survival of the biological sample or coral larvae following vitrification into droplets and warming with a laser pulse.

Fixed-duration mixing can be the mixing of cryoprotectant and gold nanorods with larvae in seawater in such a way that each larva can be exposed to cryoprotectant for approximately the same length of time before being dispensed. In some embodiments, the systems and methods described herein can be manipulated to expose individual larvae to cryoprotective agents for a desired fixed duration of time. The sample of larvae can be mixed and dispensed serially and continuously within the fixed duration. The fixed duration can vary depending on the nature of the biological material and its sensitivity to the cryoprotectant composition.

FIG. 6 is a more detailed photograph of the droplet production head of the cryopreservation system shown in FIG. 3. In one embodiment, the droplet production head can include a nozzle from which the droplets are produced. The nozzle can be a syringe tip (Nordson) that can have its Luer connector cut away. The outside of the nozzle can be factory-coated in polytetrafluoroethylene (PTFE) to reduce the inclination of droplets to wrap around to the outside of the nozzle. The pre-vitrification composition stream containing the biological sample or larvae can be produced in the direction shown by the lower black arrow. As the pre-vitrification composition stream is produced, an actuator, for example, the solenoid at the left can strike the side of the nozzle in a manner depicted by the upper black arrow. In one embodiment, the solenoid can strike the side of the nozzle at regular intervals, for example, about 360 times per minute. This can break the fluid stream from the nozzle into consistently-sized droplets that fall downward. The intervals at which the actuator can strike the side of the nozzle to generate the droplets can vary. The intervals can be, for example, between about 30 times per minute and about 3600 times per minute. In some embodiments, the intervals can be, for example, between about 60 times per minute and about 600 times per minute. Intervals outside of this range are also within the scope of this description.

The cryopreservation system may have interchangeable parts that can accommodate larvae and embryos of different sizes and may require the expansion of the mixing portion of the device to allow staged mixing of cryoprotectants at increasing concentrations at fixed time intervals that can be used for the cryopreservation of some sensitive species.

The system can incorporate droplet microfluidics to transport cells through the system and/or add reagents—e.g., a cryopreservation agent, an excipient, culture medium, metal laser absorber (e.g., gold nanorods), etc.—to the cells prior to the cells being frozen. Multi-phasic droplet microfluidics may be used to introduce a plurality of components to the cells.

Vitrification systems and the cryoprocessing systems can include other components to carry out the functions of vitrification and cryopreservation. Operation of the vitrification system can include input/output (I/O) circuitry to allow control of, for example, the timing, the rate of rotation, and/or the direction of rotation of the cryowheel. A computing system, for example, a microprocessor, can be configured for input and/or output in order to execute the vitrification process. Input can include, for example, information entered by an end user or a button to initiate the vitrification process and indicate a desired speed of the cryowheel. The computing system can be coupled through I/O circuitry to control the rotation of the wheel and/or a dispensing system. I/O circuitry can include, for example, digital-to analog converters, analog-to-digital converters, switchable outputs, etc. Power supply is provided and can be, for example, a portable power source such as a battery, a non-portable power source or the like. The power supply may be rechargeable through connection to another electrical power source, a solar cell or the like.

Input/output circuitry may include any type of input or output device including a display, keyboard or manual input, audible output, digital output such as a USB or Ethernet connection, an RF (radio frequency) or IR (infrared) input and/or output, a cellular data connection, an Ethernet connection, etc. Example RF connections include but are not limited to BLUETOOTH® connections or other short distance communication techniques, WIFI connections, or others. Cellular phone connections allow the device to communicate using a cellular phone network for communicating data and/or providing optional voice communication.

The present description can also include methods for cryopreservation of biological samples. The method can include transferring a first composition that includes cryoprotectants and laser absorbers into a first port as shown in FIG. 4 and transferring a second composition that includes a biological sample in a fluid into a second port of a cryopreservation device. These compositions, for example, may be in syringes and the contents of the syringes are injected into the cryopreservation system manually and/or with a pump.

The compositions entering through the ports can be mixed in a mixing system. The mixing system can be a serpentine mixing system as shown, for example, in FIG. 5. Other mixing systems may be used and are within the scope of this description. The serpentine mixing system can be used to propel the contents of the two compositions through the tubing and combine the contents thoroughly as the components traverse the tubing. The mixing system includes posts rotatably mounted and grooved to retain tubing of the mixing system. As the contents of the tubing travel the serpentine mixing system, the contents are combined together to form a more uniform composition by the outlet end of the mixing system. At the outlet end of the mixing system, the composition formed is the pre-vitrification composition.

The method further includes releasing the pre-vitrification composition as droplets onto the facing surface of a rotating cryowheel. Droplets may be released, for example, using a percussion separation system as shown, for example, in FIG. 6. A percussion separation system can serially produce many consistently-sized droplets from a mixing system in order to expose many larvae to cryoprotectant for a fixed time. In one embodiment, the percussion separation method can be achieved with an electromagnetic linear solenoid actuated at regular intervals. In other embodiments, this device may be furnished with other methods of mechanical percussion, such as a rotating wheel with extrusions that strike the nozzle in turn as the wheel rotates. Other methods of releasing droplets may be used and are within the scope of this description.

The method can also include vitrifying the released droplets using the methods and vitrification systems described herein.

In one embodiment, the methods of cryopreservation described herein can include fixed-duration mixing, percussion separation of droplets and rapid vitrification using the vitrification systems discussed above.

The cryopreservation devices described herein can be amenable to vitrifying compositions that contain biological material in a high-throughput manner with consistent droplet sizes, especially where the goal is to bank and laser-warm the droplets. The cryopreservation and vitrification methods described herein can lead to retention of a high percentage of the biological activity of the biological samples after warming from storage at a cryogenic temperature, e.g. below −80° C. Biologically active can refer to the use of the biological sample in a biological activity that would have been performed prior to cryopreservation. The biological activity of the cryopreserved sample is at least about 50 percent of the activity relative to the activity of the sample prior to cryopreservation. In some embodiments, the biological activity is at least about 60 percent, or at least about 70 percent, or at least about 80 percent, or at least about 90 percent, or at least about 95 percent of the activity relative to the activity of the sample prior to cryopreservation.

Laser warming can be used to recover biological activity after cryopreservation. The laser can be, for example, a near infrared (NIR) laser. The laser, for example, can provide a fluence rate from about $10^6$ W/m$^2$ to $10^9$ W/m$^2$. Other lasers and fluence rates may also be used and all are within the scope of this description. The warming rates generated by the laser can vary and are fast enough to maintain integrity of the sample. In one embodiment, the warming rates can achieve the CWR. The warming rates can be at least about 300,000° C./min. In some embodiments, the warming rates can be between about 400,000° C./min and about 24 million° C./min.

Although specific embodiments have been illustrated and described herein, any arrangement that achieves the same purpose, structure, or function may be substituted for the specific embodiments shown. This application is intended to cover any adaptations or variations of the example embodiments of the invention described herein. These and other embodiments are within the scope of the following claims and their equivalents.

What is claimed is:

1. A vitrification system comprising:
a rotatable cryowheel comprising a porous facing surface, wherein the rotatable cryowheel is in a cryogenic container, wherein the facing surface of the cryowheel lightly adheres droplets when the droplets are released onto the facing surface of the cryowheel as the cryowheel emerges above the level of a cryogenic coolant in the cryogenic container, wherein the droplets comprise a biological sample and wherein rotation of the cryowheel submerges the droplets of the biological sample on the facing surface into the cryogenic coolant.

2. The system of claim 1, wherein a material for the facing surface of the cryowheel is selected from the group consisting of balsa wood, polystyrene foam, and ethylene vinyl acetate foam.

3. The system of claim 1, further comprising an apparatus for driving the rotation of the cryowheel.

4. The system of claim 1, further comprising a scraper for detaching the biological sample from the facing surface in the cryogenic coolant and forming a vitrified biological sample.

5. The system of claim 4, further comprising a tray, wherein the tray is configured to receive the vitrified biological sample.

6. The system of claim 1, wherein the droplet further comprises cryoprotectants and laser absorbers.

7. The system of claim 1, wherein the cryowheel comprises a notched edge for engaging a driving system for rotation.

8. The system of claim 1, wherein the biological sample is selected from the group consisting of zebrafish embryos, pancreatic islets, *Xenopus* oocytes, *C. elegans,* germplasm, coral germplasm, coral larvae, mammalian tissue, mammalian germplasm, bacteria or protozoans.

9. A cryopreservation device comprising:
at least a first input port and a second input port;
a mixing system comprising tubing with an inlet end and an outlet end, wherein the inlet end is operably connected to the first port and the second port, wherein the tubing is configured to mix compositions entering from the at least first inlet port and second input port and as the compositions traverse the tubing from the inlet end to the outlet end;
a droplet production head comprising a nozzle with a tip and an actuator, the nozzle operably attached to the outlet end of the tubing in the mixing system and the actuator configured to tap the side of the nozzle at set intervals to dislodge a consistent sized droplet of the combined composition from the tip of the nozzle; and
a rotatable cryowheel comprising a porous facing surface, wherein the rotatable cryowheel is in a cryogenic container, wherein the facing surface of the cryowheel lightly adheres the droplets of the composition when released onto the facing surface of the cryowheel as the cryowheel emerges above the level of a cryogenic coolant in the cryogenic container, wherein rotation of the cryowheel submerges the droplets of the composition into the cryogenic coolant, wherein the droplets comprise a biological sample.

10. The device of claim 9, wherein the mixing system comprises a serpentine mixing system comprising at least three vertical posts configured to retain the tubing in a serpentine configuration, promoting the thorough mixing of the compositions introduced into the mixing system.

11. The device of claim 10, wherein the serpentine mixing system is configured to dispose the tubing on a level plane and to prevent biological samples of density different from the density of surrounding composition from accumulating in low or high points of the tubing.

12. The device of claim 9, wherein the actuator is a solenoid actuator.

\* \* \* \* \*